(12) United States Patent
Ma et al.

(10) Patent No.: US 12,374,016 B2
(45) Date of Patent: Jul. 29, 2025

(54) DIGITAL OBJECT ANIMATION AUTHORING INTERFACES

(71) Applicant: Adobe Inc., San Jose, CA (US)

(72) Inventors: Jiaju Ma, Providence, RI (US); Li-Yi Wei, Redwood City, CA (US); Kazi Rubaiat Habib, Seattle, WA (US)

(73) Assignee: Adobe Inc., San Jose, CA (US)

( * ) Notice: Subject to any disclaimer, the term of this patent is extended or adjusted under 35 U.S.C. 154(b) by 457 days.

(21) Appl. No.: 17/887,815

(22) Filed: Aug. 15, 2022

(65) Prior Publication Data
US 2024/0054710 A1 Feb. 15, 2024

(51) Int. Cl.
*G06T 13/40* (2011.01)
(52) U.S. Cl.
CPC .................................... *G06T 13/40* (2013.01)
(58) Field of Classification Search
None
See application file for complete search history.

(56) References Cited

U.S. PATENT DOCUMENTS

| 8,941,666 B1 * | 1/2015 | Kovar | G06F 8/30 |
| | | | 345/473 |
| 12,076,868 B2 * | 9/2024 | Kang | B25J 9/1689 |

OTHER PUBLICATIONS

Thinking Penguin, Conditions & Operators | Blender Animation Nodes (Visual Programming for Artists), posted Mar. 19, 2017, https ://www.youtube.com/watch?v=FjKdB7g7al8 (Year: 2017).*
Limy Chitou. "Blender 2.8 Texture coordinates keyframes are not visible in Graph Editor" posted May 24, 2019, https://blender.stackexchange.com/questions/141375/blender-2-8-texture-coordinates-keyframes-are-not-visible-in-graph-editor (Year: 2019).*
Miziziziz, "Godot Quick Tip—How to use Animation Trees", posted Apr. 22, 2019, https://www.youtube.com/watch?v=WY2cN9uG6W8 (Year: 2019).*
Paul Balzer, " Simple 3D Collision Detection with Python Scripting in Blender", posted 2016, https://www.cbcity.de/simple-3d-collision-detection-with-python-scripting-in-blender (Year: 2016).*
STYLY Magazine, [Blender 2.8] Introduction to Animation Nodes, posted Aug. 2020 (Year: 2020).*

(Continued)

*Primary Examiner* — Sarah Le
(74) *Attorney, Agent, or Firm* — FIG. 1 Patents

(57) ABSTRACT

An animation system configured for generating an animation scene that includes at least one animation stylization effect applied to one or more three-dimensional digital objects is described. The animation system includes an interface having a timeline portion and a node graph portion. The timeline portion represents various animation stylization effects as clips arranged chronologically relative to a timeline and the node graph portion includes a node cluster for each clip, where individual node clusters are made up of an animate node, an action node, and an effect node. Input at the timeline portion modifying at least one parameter of the animation scene propagates to the node graph portion, and vice versa. The animation system thus presents dual representations of an animation scene in a manner that enables complex animation customizations while organizing animation effects in a simplified, chronological manner.

20 Claims, 10 Drawing Sheets

(56) References Cited

OTHER PUBLICATIONS

Tom Davidson, "12 Principles of Animation—Timing, Spacing, Squashing & Stretching", Jan. 27, 2014, https://tomlucasdav.wordpress.com/2014/01/27/12-principles-of-animation/ (Year: 2014).*

"Adobe Aero", Adobe Website [retrieved Jun. 8, 2022]. Retrieved from the Internet <https://www.adobe.com/products/aero.html>., Jun. 5, 2018, 12 pages.

"Adobe XD", Adobe Inc. [retrieved Jun. 8, 2022]. Retrieved from the Internet <https://www.adobe.com/products/xd.html>., Mar. 14, 2016, 10 pages.

"Animation Nodes", Jacques Lucke [retrieved Jun. 14, 2022]. Retrieved from the Internet <https://animation-nodes.com/>., 2021, 2 Pages.

"Autodesk Arnold", Autodesk [retrieved Jun. 8, 2022]. Retrieved from the Internet <https://www.arnoldrenderer.com/>., 1998, 4 Pages.

"Autodesk Maya", Autodesk [retrieved Jun. 8, 2022]. Retrieved from the Internet <https://www.autodesk.com/products/maya/overview?term=1-YEAR&tab=subscription>., 1998, 8 Pages.

"Blender Foundation", Blender, Blender.org [retrieved Jun. 13, 2022]. Retrieved from the Internet <https://www.blender.org/>., May 2002, 15 Pages.

"Cascadeur Research: Physics In Animation", 80 level [retrieved Jun. 13, 2022]. Retrieved from the Internet <https://80.lv/articles/cascadeur-research-physics-in-animation>., Mar. 11, 2020, 10 pages.

"Cinema 4D", Maxon Computer GMBH. [retrieved Jun. 14, 2022]. Retrieved from the Internet <https://www.maxon.net/en/cinema-4d>., 1990, 7 Pages.

"Houdini", SideFX [retrieved Jun. 14, 2022]. Retrieved from the Internet <https://www.sidefx.com/products/houdini/>., Oct. 20, 2021, 11 Pages.

"KeyShot 11.1", Luxion, Inc. [retrieved Jun. 14, 2022]. Retrieved from the Internet <https://www.keyshot.com/>., Feb. 8, 2022, 38 Pages.

"Microsoft PowerPoint", Microsoft [retrieved Jun. 14, 2022]. Retrieved from the Internet <https://www.microsoft.com/en-US/microsoft-365/powerpoint>., 1987, 7 Pages.

"OctaneRender", OTOY Inc. [retrieved Jun. 14, 2022]. Retrieved from the Internet <https://home.otoy.com/render/octane-render/>., Feb. 8, 2021, 5 Pages.

"Squash—Stretch Maker for Maya", Gumroad [retrieved Jun. 13, 2022]. Retrieved from the Internet <https://khaledhussein.gumroad.com/l/AuyUu>., 6 Pages.

"Squash & Stretch Kit—Effect Component for Unity", YouTube Video uploaded by Long Bunny Labs [online][retrieved Jun. 14, 2022]. Retrieved from the Internet <https://www.youtube.com/watch?v=RjFjx_sC_XM>., Dec. 17, 2017, 4 Pages.

"The 12 Principles of Animation in Games", YouTube Video uploaded by New Frame Plus [online][retrieved Jun. 14, 2022]. Retrieved from the Internet <https://www.youtube.com/playlist?list=PLugegG07di3886WYN6u7v9BeBd0VFG3_J>., Jul. 18, 2021, 1 Page.

"TouchDesigner", Derivative [retrieved Jun. 13, 2022]. Retrieved from the Internet <https://derivative.ca/>., 2000, 6 Pages.

"Unity", Unity Technologies [retrieved Jun. 14, 2022]. Retrieved from the Internet <https://unity.com/>., Aug. 2, 2004, 17 Pages.

"You are the director with Timeline", Unity Technologies [retrieved Jun. 14, 2022]. Retrieved from the Internet <https://unity.com/features/timeline>., 11 Pages.

Adobe, , "#PhysicsWhiz | Adobe MAX Sneaks 2020", YouTube Video uploaded by Associated Press [online][retrieved Jun. 8, 2022]. Retrieved from the Internet <https://www.youtube.com/watch?v=rutAGoBZtew>., Oct. 21, 2020, 4 Pages.

Arora, Rahul et al., "MagicalHands: Mid-Air Hand Gestures for Animating in VR", Proceedings of the 32nd Annual ACM Symposium on User Interface Software and Technology [retrieved Jun. 8, 2022]. Retrieved from the Internet <https://www.dgp.toronto.edu/projects/magical-hands/magical_hands_uist19_arora_et_al_lowres.pdf>., Oct. 17, 2019, 15 Pages.

Bai, Yunfei et al., "Artist-directed dynamics for 2D animation", ACM Transactions on Graphics, vol. 35, No. 4 [retrieved Jun. 8, 2022]. Retrieved from the Internet <https://web.archive.org/web/20161223225109id_/http://www.cc.gatech.edu/~ybai30/artistic_dynamics/artistic_dynamics_sig16.pdf>., Jul. 11, 2016, 10 pages.

Barzel, Ronen et al., "Plausible Motion Simulation for Computer Graphics Animation", Computer Animation and Simulation '96, Proceedings of the Eurographics Workshop [retrieved Jun. 8, 2022]. Retrieved from the Internet <http://static.cs.brown.edu/people/jhughes/papers/Barzel-PMS-1996/paper.pdf>., 1996, 14 pages.

Beane, Andy , "3D Animation Essentials", John Wiley & Sons, New Jersey [retrieved Jun. 8, 2022]. Retrieved from the Internet <https://dl.softgozar.com/Files/Ebook/3D_Animation_Essentials_Softgozar.com.pdf>., Jan. 25, 2012, 354.

Bergou, Miklos et al., "Tracks: Toward Directable Thin Shells", ACM Transactions on Graphics 26 [retrieved Jun. 8, 2022]. Retrieved from the Internet <http://citeseerx.ist.psu.edu/viewdoc/download?doi=10.1.1.69.1721&rep=rep1&type=pdf>., 2007, 10 pages.

Blow, Jonathan , "Game Development: Harder Than You Think: Ten or twenty years ago it was all fun and games. Now it's blood, sweat, and code.", Queue, vol. 1, No. 10 [retrieved Jun. 8, 2022]. Retrieved from the Internet <https://dl.acm.org/doi/pdf/10.1145/971564.971590>., Feb. 2004, 10 pages.

Brigsted, Thor , "xNode", GitHub, Inc. Uploaded by Siccity [retrieved Jun. 8, 2022]. Retrieved from the Internet <https://github.com/Siccity/xNode>., 2021, 4 Pages.

Cao, Xiang , "Wonder painter: turn anything into animation", SIGGRAPH '18: ACM SIGGRAPH 2018 Real-Time Live! [retrieved Aug. 18, 2022]. Retrieved from the Internet <https://doi.org/10.1145/3229227.3229228>., Aug. 12, 2018, 1 Page.

Coros, Stelian et al., "Deformable objects alive!", ACM Transactions on Graphics, vol. 31, No. 4 [retrieved Jun. 13, 2022]. Retrieved from the Internet <http://www.iro.umontreal.ca/~bernhard/PDF/DeformableObjectsAlive.pdf>., Jul. 1, 2012, 9 Pages.

Dvorožňák, Marek et al., "Monster Mash: A Single-View Approach to Casual 3D Modeling and Animation", ACM Transactions on Graphics, vol. 39, No. 6 [retrieved Jun. 13, 2022]. Retrieved from the Internet <https://dcgi.fel.cvut.cz/home/sykorad/Dvoroznak20-SA.pdf>., Sep. 10, 2021, 12 Pages.

Eom, Haegwang et al., "Synthesizing Character Animation with Smoothly Decomposed Motion Layers", Computer Graphics Forum, vol. 39, No. 1 [retrieved Jun. 13, 2022]. Retrieved from the Internet <https://koasas.kaist.ac.kr/bitstream/10203/274198/1/000500908300001.pdf>., Nov. 29, 2019, 12 Pages.

Erleben, Kenny et al., "Physics-Based Animation", Charles River Media, Inc. Hingham, Massachusetts [retrieved Jun. 13, 2022]. Retrieved from the Internet <https://iphys.files.wordpress.com/2020/01/erleben.ea05.pdf>., Sep. 30, 2005, 830 Pages.

Guay, Martin et al., "Space-time sketching of character animation", ACM Transactions on Graphics, vol. 34, No. 4 [retrieved Jun. 13, 2022]. Retrieved from the Internet <https://cgl.ethz.ch/teaching/seminarSS16/papers/SpaceTimeSketching.pdf>., Sep. 10, 2021, 11 Pages.

Huk, Thomas et al., "Computer Animations as Learning Objects: What is an Efficient Instructional Design, and for whom?", Proceedings of Iadis International Conference WWW/Internet 2003 [retrieved Jun. 13, 2022]. Retrieved from the Internet <http://citeseerx.ist.psu.edu/viewdoc/download?doi=10.1.1.92.3078&rep=rep1&type=pdf>., Nov. 2003, 4 Pages.

Jacobs, Jennifer et al., "Extending Manual Drawing Practices with Artist-Centric Programming Tools", CHI Conference on Human Factors in Computing Systems [retrieved Jun. 13, 2022]. Retrieved from the Internet <https://dspace.mit.edu/bitstream/handle/1721.1/128479/jacobs-chi2018-extending-manual-drawing.pdf?sequence=2&isAllowed=y>., Apr. 21, 2018, 14 Pages.

Jeon, Jaewoong et al., "A sketch interface to empower novices to create 3D animations", Computer Animation and Virtual Worlds, vol. 21, No. 3-4 [retrieved Aug. 18, 2022]. Retrieved from the Internet <https://doi.org/10.1002/cav.353>., May 29, 2010, 10 Pages.

Jin, Ming et al., "AniMesh: interleaved animation, modeling, and editing", ACM Transactions on Graphics, vol. 34, No. 6 [retrieved Jun. 13, 2022]. Retrieved from the Internet <https://doi.org/10.1145/2816795.2818114>., <https://cragl.cs.gmu.edu/animesh/AniMesh-%

(56) References Cited

OTHER PUBLICATIONS

20Interleaved%20Animation,%20Modeling,%20and%20Editing%20(Ming%20Jin,%20Dan%20Gopstein,%20Yotam%20Gingold,%20Andrew%20Nealen%202015%20SIGGRAPH%20Asia).pdf>, Nov. 2, 2015, 8 Pages.

Jones, Ben et al., "Dynamic sprites: artistic authoring of interactive animations", Computer Animation and Virtual Worlds, vol. 26, No. 2 [retrieved Jun. 13, 2022]. Retrieved from the Internet <http://citeseerx.ist.psu.edu/viewdoc/download?doi=10.1.1.650.5615&rep=rep1&type=pdf>., Jul. 28, 2014, 12 Pages.

Jones, Benjamin, "Artist-guided Physics-based Animation", The University of Utah ProQuest Dissertations Publishing [retrieved Jun. 13, 2022]. Retrieved from the Internet <https://web.archive.org/web/20200218203511id_/https://collections.lib.utah.edu/dl_files/cc/9a/cc9a8530b49505b90ebd92d51527d6ef14a693c9.pdf>., Aug. 2015, 82 Pages.

Kazi, Rubaiat H. et al., "Draco: Bringing Life to Illustrations with Kinetic Textures", Proceedings of the SIGCHI Conference on Human Factors in Computing Systems [retrieved Jun. 13, 2022]. Retrieved from the Internet <https://web.archive.org/web/20200309070443id_/https://hal.inria.fr/hal-00926847/file/draco.pdf>., Jun. 10, 2014, 11 Pages.

Kazi, Rubaiat H. et al., "Kitty: Sketching Dynamic and Interactive Illustrations", Proceedings of the 27th annual ACM symposium on User interface software and technology [retrieved Jun. 13, 2022]. Retrieved from the Internet <https://web.archive.org/web/20160709142731id_/http://autodeskresearch.org/pdf/Kitty.pdf>., Oct. 5, 2014, 11 Pages.

Kazi, Rubaiat H. et al., "Motion Amplifiers: Sketching Dynamic Illustrations Using the Principles of 2D Animation", CHI Conference on Human Factors in Computing Systems [retrieved Jun. 13, 2022]. Retrieved from the Internet <https://damassets.autodesk.net/content/dam/autodesk/www/autodesk-reasearch/Publications/pdf/motion-amplifiers-sketching-dynamic.pdf>., May 7, 2016, 11 pages.

Kazi, Rubaiat Habib, "ChronoFab: Fabricating Motion", Proceedings of the 2016 CHI Conference on Human Factors in Computing Systems [retrieved Jun. 13, 2022]. Retrieved from the Internet <https://www.tovigrossman.com/papers/chronofab.pdf>., May 7, 2016, 11 Pages.

Lasseter, John et al., "Principles of Traditional Animation Applied to 3D Computer Animation", Proceedings of the 14th annual conference on Computer graphics and interactive techniques [retrieved Jun. 13, 2022]. Retrieved from the Internet <https://www.cs.drexel.edu/~david/Classes/Papers/p35-lasseter.pdf>., Aug. 1, 1987, 10 pages.

Leiva, Germán et al., "Rapido: Prototyping Interactive AR Experiences through Programming by Demonstration", The 34th Annual ACM Symposium on User Interface Software and Technology [retrieved Jun. 13, 2022]. Retrieved from the Internet <https://doi.org/10.1145/3472749.3474774>., Oct. 12, 2021, 12 Pages.

Moore, Matthew et al., "Collision Detection and Response for Computer Animation", Proceedings of the 15th annual conference on Computer graphics and interactive techniques [retrieved Jun. 14, 2022]. Retrieved from the Internet <https://people.cs.clemson.edu/~dhouse/courses/817/papers/moorewilhelms88.pdf>., Jun. 1, 1988, 10 pages.

Myers, Brad, "Taxonomies of visual programming and program visualization", Journal of Visual Languages and Computing, vol. 1, No. 1 [retrieved Jun. 14, 2022]. Retrieved from the Internet <https://www.cs.cmu.edu/~bam/papers/vltax2.pdf>., Sep. 20, 1989, 33 Pages.

Peng, Mengqi et al., "Autocomplete 3D sculpting", ACM Transactions on Graphics, vol. 37, No. 4 [retrieved Jun. 14, 2022]. Retrieved from the Internet <https://www.researchgate.net/profile/Li-Yi-Wei/publication/315710380_Autocomplete_3D_Sculpting/links/5fde597745851553a0d5b4ae/Autocomplete-3D-Sculpting.pdf>., Jul. 30, 2018, 10 pages.

Saquib, Nazmus et al., "Interactive Body-Driven Graphics for Augmented Video Performance", Proceedings of the 2019 CHI Conference on Human Factors in Computing Systems [retrieved Jun. 14, 2022]. Retrieved from the Internet <https://web.archive.org/web/20200510122842id_/https://hal.archives-ouvertes.fr/hal-02005318/file/final.pdf>., Feb. 2, 2019, 13 pages.

Schmid, Johannes et al., "Programmable Motion Effects", ACM Transactions on Graphics, vol. 29, No. 57 [retrieved Jun. 14, 2022]. Retrieved from the Internet <https://cgl.ethz.ch/Downloads/Publications/Papers/2010/Schm10/Schm10.pdf>., Jul. 2010, 9 Pages.

Schmidt, Francis et al., "3D animation: difficult or impossible to teach and learn?", SIGGRAPH '04: ACM SIGGRAPH 2004 Panels [retrieved Jun. 14, 2022]. Retrieved from the Internet <https://history.siggraph.org/wp-content/uploads/2022/02/2004-03_Schmidt_3D-Animation.pdf>., Aug. 8, 2004, 2 Pages.

Sederberg, Thomas et al., "Free-Form Deformation of Solid Geometric Models", SIGGRAPH '86: Proceedings of the 13th annual conference on Computer graphics and interactive techniques [retrieved Jun. 14, 2022]. Retrieved from the Internet <https://www.cse.iitd.ac.in/~jatin/minor_p/papers/sederberg.pdf>., Aug. 31, 1986, 3 Pages.

Shneiderman, Ben, "Creativity Support Tools: Accelerating Discovery and Innovation.", Communications of the ACM, vol. 50, No. 12 [retrieved Jun. 14, 2022]. Retrieved from the Internet <https://www.cs.umd.edu/~ben/papers/Shneiderman2007Creativity.pdf>., Sep. 10, 2021, 13 Pages.

Sousa, Tiago Boldt et al., "Dataflow Programming Concept, Languages and Applications", Doctoral Symposium on Informatics Engineering, vol. 130 [retrieved Jun. 14, 2022]. Retrieved from the Internet <https://paginas.fe.up.pt/~prodei/dsie12/papers/paper_17.pdf>., Jan. 2012, 12 Pages.

Thomas, Frank et al., "The Illusion of Life: Disney Animation", in: Disney Editions, New York, NY, USA. [retrieved Jun. 14, 2022]. Retrieved from the Internet <https://ia800903.us.archive.org/31/items/TheIllusionOfLifeDisneyAnimation/The%20Illusion%20of%20Life%20Disney%20Animation.pdf>., Oct. 19, 1955, 546 Pages.

Thompson, J. et al., "Understanding the Design Space and Authoring Paradigms for Animated Data Graphics", Computer Graphics Forum, vol. 39, No. 3 [retrieved Jun. 14, 2022]. Retrieved from the Internet <https://zcliu.org/animate/Eurovis2020-authoring-paradigm.pdf>., Sep. 10, 2021, 12 Pages.

Truong, Anh et al., "Automatic Generation of Two-Level Hierarchical Tutorials from Instructional Makeup Videos", Proceedings of the 2021 CHI Conference on Human Factors in Computing Systems [retrieved Jun. 14, 2022]. Retrieved from the Internet <https://storage.googleapis.com/pub-tools-public-publication-data/pdf/d6635d0826cf29c217653bc4976d5c234713b249.pdf>., May 7, 2021, 16 Pages.

Wang, Jue et al., "The cartoon animation filter", ACM Transactions on Graphics, vol. 25, No. 3 [retrieved Jun. 14, 2022]. Retrieved from the Internet <https://web.archive.org/web/20081230113738id_/http://vis.berkeley.edu:80/papers/animfilter/TheCartoonAnimationFilter.pdf>., Jul. 1, 2006, 5 Pages.

West, Chris, "Mega-Fiers", Chris West [retrieved Jun. 14, 2022]. Retrieved from the Internet <http://www.west-racing.com/mf/?page_id=2>., 2010, 6 Pages.

Xia, Haijun et al., "Object-Oriented Drawing", Proceedings of the 2016 CHI Conference on Human Factors in Computing Systems [retrieved Jun. 14, 2022]. Retrieved from the Internet <https://www.tovigrossman.com/papers/ood.pdf>., May 7, 2016, 12 Pages.

Zhang, Lei et al., "FlowMatic: An Immersive Authoring Tool for Creating Interactive Scenes in Virtual Reality", Proceedings of the 33rd Annual ACM Symposium on User Interface Software and Technology [retrieved Jun. 14, 2022]. Retrieved from the Internet <https://from.so/static/bae7b1bd261dc514b5fefa96a82c1c6d/5880d75bc63daa0891b7e32d72f3cc72.pdf>., Oct. 20, 2020, 12 Pages.

\* cited by examiner

900

902
Receive input identifying a three-dimensional digital object

904
Generate an animation interface configured for generating an animation scene depicting an animation of the three-dimensional digital object

906
Generate a timeline portion that includes at least one track defining the animation scene, the at least one track including one or more clips that each represent an animation stylization effect applied to the three-dimensional object

908
Generate a node graph portion that includes a node cluster for each of the one or more clips represented in the timeline portion, the node cluster including an animate node, an effect node, and an action node

910
Generate a parameter controls portion that displays at least one control configured to modify a parameter for a stylization effect applied to the three-dimensional digital object

912
Receive input modifying at least one parameter of a stylization effect applied to the three-dimensional object

914
Update the animation interface based on the input modifying the at least one parameter of the stylization effect applied to the three-dimensional object

916
Output the animation scene generated via the animation interface

DIGITAL OBJECT ANIMATION AUTHORING INTERFACES

BACKGROUND

In the field of digital content creation, three-dimensional computer animation is a popular media format. Existing computer animation platforms, however, are complicated and involve technically unintuitive tools. Consequently, users without comprehensive knowledge of and experience with specific computer animation platforms are discouraged from creating digital content using those specific conventional computer animation platforms. Developing mastery of even basic conventional computer animation tools is a tedious process, which is further compounded when extended to learning higher-level principles involved in creating expressive animations. Thus, digital content creators are faced with significant technical barriers in generating even the most basic three-dimensional computer animations.

SUMMARY

An animation system that outputs an animation interface configured for generating an animation scene that includes at least one animation stylization effect applied to one or more three-dimensional digital objects is described. The animation interface presents a plurality of portions configured to receive input that defines animation parameters for the animation scene, including a timeline portion and a node graph portion. The timeline portion represents various animation stylization effects as clips arranged chronologically relative to a timeline, where each clip spans a distance along the timeline that indicates a playback position and duration of the animation clip. Each clip further indicates a corresponding type of stylization effect performed by the animation as well as a digital object to which the animation pertains. The node graph portion of the animation interface includes a node cluster for each clip, where individual node clusters are made up of an animate node, an action node, and an effect node.

The animate node specifies a function that drives one or more animation effects represented by the animation clip and depicts an animation curve that represents a magnitude (e.g., intensity) of the one or more animation effects as expressed during playback of the animation clip. The effect node specifies an animation stylization defined by the node cluster, such as a preset animation stylization selected from an animation library, a custom animation stylization defined via user input at the node graph, or combinations thereof. The action node defines at least one action performed as part of executing the animation stylization expressed during playback of the animation clip.

In response to receiving input at the timeline portion modifying at least one parameter of the animation scene, the animation system updates the node graph portion to reflect the modified at least one parameter. In a similar manner, in response to receiving input at the node graph portion that modifies at least one animation parameter, the animation interface is updated to reflect the modified at least one animation parameter in the timeline portion of the interface. The combination of timeline and node graph portions of the animation interface provide intuitive controls that enable generation of complex animation scenes that include custom animations generated from a library of basic predefined stylization effects.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 9 is a flow diagram depicting a procedure in an example implementation of generating an animation scene using an animation interface that includes a timeline portion and a node graph portion for defining the animation scene.

DETAILED DESCRIPTION

Figure 1:
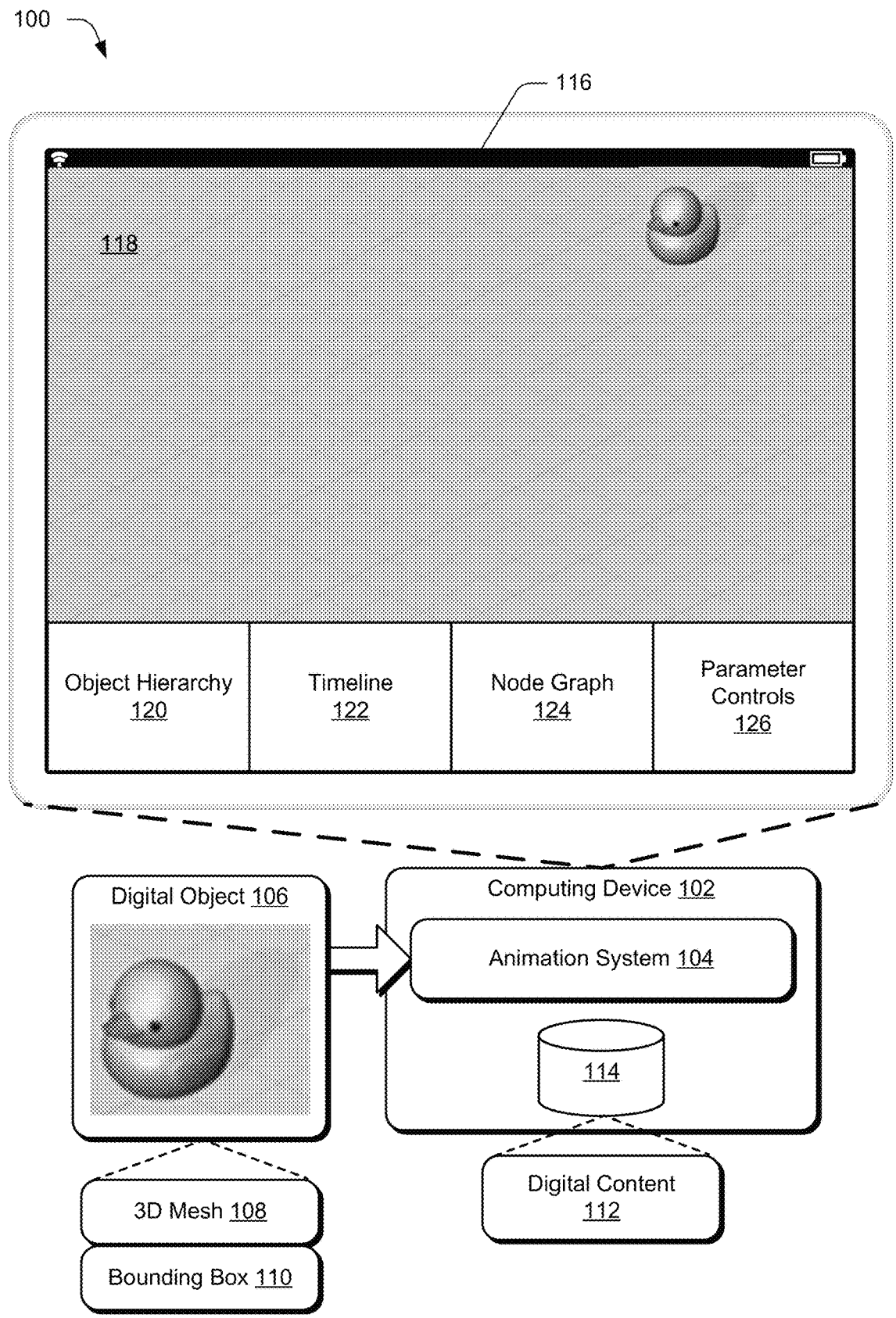
FIG. 1 is an illustration of a digital medium environment in an example implementation that is operable to employ an animation system for animating a digital object.

Three-dimensional computer animation is an increasingly popular media format. Existing computer animation platforms, however, are complicated and involves technically unintuitive tools. Users of these conventional animation platforms are thus forced to dedicate significant time to learn and develop familiarity with tool functionality before being able to generate visually cohesive animations. Developing mastery of even basic conventional computer animation tools is a tedious process, which is further compounded when extended to learning higher-level principles involved in creating expressive animations. As a consequence, conventional platforms often produce animations that are visually disjointed due to the significant technical barriers involved in generating even the most basic animation effects.

To address these shortcomings, an animation system is described. The animation system is advantageously configured to display an animation interface that includes various portions designed to facilitate generation of complex animation scenes in an intuitive manner. For instance, the animation interface includes an object hierarchy portion that identifies one or more digital objects selected for inclusion in an animation scene. The interface additionally includes an animation preview portion that displays the one or more digital objects together with at least one animation stylization effect applied to the digital object during playback of the animation scene. In this manner, the animation preview portion provides an animator with a playback preview of the animation scene while it is being created. The animation interface further includes a timeline portion that represents the various animation stylization effects applied to the one or more digital objects as clips arranged chronologically relative to a timeline, where each clip spans a distance along the timeline that indicates a playback position and duration of the animation clip. Each clip further indicates a corresponding type of stylization effect performed by the animation as well as a digital object to which the animation pertains.

The animation interface further includes a node graph portion that includes a node cluster for each clip, where individual node clusters are made up of an animate node, an action node, and an effect node. The animate node specifies a function that drives one or more animation effects represented by the animation clip and depicts an animation curve that represents a magnitude (e.g., intensity) of the one or more animation effects as expressed during playback of the animation clip. The effect node specifies an animation stylization defined by the node cluster, such as a preset animation stylization selected from an animation library, a custom animation stylization defined via user input at the node graph, or combinations thereof. The action node defines at least one action performed as part of executing the animation stylization expressed during playback of the animation clip.

In response to receiving input at the timeline portion modifying at least one parameter of the animation scene, the node graph portion is updated to reflect the modified at least one parameter. In a similar manner, in response to receiving input at the node graph portion that modifies at least one animation parameter, the animation interface is updated to reflect the modified at least one animation parameter in the timeline portion of the interface. The combination of timeline and node graph portions of the animation interface provide intuitive controls that enable generation of complex animation scenes that include custom animations generated from a library of basic predefined stylization effects.

To facilitate complex animation generation, the animation system is populated with an animation library that includes preconfigured parameters for various animation stylization effects that can be modified and combined with one another to create right and complex animation stylization effects. In implementations where the animation scene is generated as including multiple digital objects and animation stylization effects cause two or more of the digital objects to collide with one another, the animation system is configured to detect the object collision and output a collision marker in the timeline portion of the interface that indicates objects involved in the collision, a playback duration at which the collision occurs, and a point in three-dimensional space locating the collision. Collision markers enable even inexperienced users to accurately pinpoint and tailor animation effects to mimic real-world forces, which is not enabled via conventional animation platforms.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 is illustrated as including an animation system 104. The animation system 104 is configured to generate an animation that includes at least one digital object 106. The digital object 106 is representative of a digital object that is defined in three-dimensional space by a 3D mesh 108 and a bounding box 110. The 3D mesh 108 is representative of a polygon mesh comprising a collection of vertices, edges, and faces that collectively define the shape of the digital object 106 as a polyhedral object. In some implementations, the 3D mesh 108 is representative of a triangle mesh where vertices and edges form triangle primitives. Alternatively or additionally, the 3D mesh 108 is representative of quadrilateral primitives, convex polygons (e.g., n-gons), concave polygons, combinations thereof, and so forth. In some implementations, the 3D mesh 108 is a volumetric mesh, such that the 3D mesh represents both the surface and the volume of the digital object 106.

The bounding box 110 is representative of a closed volume that contains the 3D mesh 108 defining the digital object 106. For instance, in an implementation where the 3D mesh 108 represents the digital object 106 in a Cartesian coordinate system, the bounding box 110 is a three-dimensional box having dimensions constrained by a volume of the 3D mesh 108. Specifically, the bounding box 110 spans a distance relative to the x-axis defined by a greatest distance between two points of the 3D mesh 108 along a line parallel to the x-axis. Likewise, the bounding box 110 spans a distance relative to the y-axis defined by a greatest distance between two points of the 3D mesh 108 along a line parallel to the y-axis, and spans a distance relative to the z-axis defined by a greatest distance between two points of the 3D mesh 108 along a line parallel to the z-axis. In some implementations, the bounding box 110 is representative of a geometry other than a box, such as a sphere, a cylinder, a polyhedron, and so forth. Thus, regardless of its geometry, the bounding box 110 is representative of a shape in three-dimensional space that encompasses the 3D mesh 108 for the digital object 106.

In some implementations, the digital object 106 along with its 3D mesh 108 and bounding box 110 is representative of an instance of digital content 112 maintained in a data store 114 of the computing device 102. Alternatively or additionally, the digital object 106, the 3D mesh 108, and the bounding box 110 are representative of instances of digital content stored via one or more storage devices implemented remotely from the computing device 102.

When provided with the digital object 106 to be animated, the animation system 104 outputs an animation interface 116

(e.g., by displaying the animation interface 116 via a display of the computing device 102). The animation interface 116 includes an animation preview 118, which displays the digital object 106 and any animation effects applied to the digital object 106 via one or more controls of the animation interface 116. As described in further detail below, the animation preview 118 is configured to display a playback of one or more animation effects applied to the digital object 106, such that a user of the animation system 104 is provided with a visual indication of how a resulting animation will appear during interaction with the animation interface 116.

The animation interface 116 additionally includes an object hierarchy 120, which is representative of a portion that displays one or more digital objects that are selected for inclusion in an animation scene or are available for inclusion in the animation scene being displayed by the animation preview 118. In some implementations, the animation system 104 receives an indication of the digital object 106 via user input selecting the digital object 106 from the object hierarchy 120 portion of the animation interface 116.

The animation interface 116 further includes a timeline 122 portion. The timeline 122 portion includes a display of one or more tracks that collectively define an animation scene. Each track in the timeline 122 includes at least one clip, which is a unit of animation assigned to the digital object 106. Clips are arranged relative to a playback timeline, which provides an intuitive overview of when various animation effects are applied to the digital object 106 during playback of the animation. The timeline 122 further enables adjusting (e.g., repositioning and resizing) of individual animation within a track independent of defining any keyframes. In contrast to conventional animation platforms that use keyframes, which define start and end states of an animation's style, as well as optional waypoints therebetween, individual clips represented in the timeline 122 that define an entire unit of animation (e.g., from start to end) are moveable, adjustable, and otherwise represented as a single interface element. As described in further detail below, properties for a certain animation stylization applied to the digital object 106 are represented as a single clip in the timeline 122 in a manner that enables a user of the animation system 104 to configure timing, duration, and visual appearance of the animation via interaction with the single clip.

The animation interface 116 further includes a node graph 124 portion, which is generated and modified in conjunction with the timeline 122, such that modifications made to the timeline 122 propagate to the node graph 124, and vice versa. In some implementations, the node graph 124 portion is displayed in the animation interface 116 alternatively with the timeline 122 portion, such that a user of the animation system 104 switches between views of the timeline 122 and the node graph 124. Alternatively, in some implementations the timeline 122 and the node graph 124 are displayed simultaneously in the animation interface 116.

The node graph 124 includes a node cluster for each animation clip represented in the timeline 122, where various nodes of the node cluster define parameters of the animation clip. Individual nodes of a node cluster are editable to define and adjust behaviors of an animation stylization applied to a digital object 106, to create custom new animation stylizations, and combinations thereof. Each node cluster of the node graph 124 defining an animation clip represented in the timeline 122 includes at least three nodes: an animate node, an effect node, and an action node.

The animate node specifies a function that drives one or more animation effects represented by the animation clip and depicts an animation curve that represents a magnitude (e.g., intensity) of the one or more animation effects as expressed during playback of the animation clip. The effect node specifies an animation stylization defined by the node cluster, such as a preset animation stylization selected from an animation library, a custom animation stylization defined via user input at the node graph 124, or combinations thereof. The action node in the node cluster defines at least one action performed as part of executing the animation stylization expressed during playback of the animation clip. Functionality of node clusters and individual nodes of the node graph 124 is described in further detail below.

The animation interface 116 further includes one or more parameter controls 126. The parameter controls 126 include controls that are selectable via user input to define and/or adjust parameters pertaining to an object (e.g., the digital object 106), an animation stylization defined by an animation clip of the timeline 122, an animation stylization defined by a node in the node graph 124, or combinations thereof. In this manner, the animation interface 116 provides a visual preview of, and intuitive controls for generating, animation stylizations applied to one or more digital objects.

Having considered an example digital medium environment, consider now a discussion of an example systems useable to generate an animation that includes at least one three-dimensional digital object in accordance with the techniques described herein.

Digital Object Animation System

Figure 2:
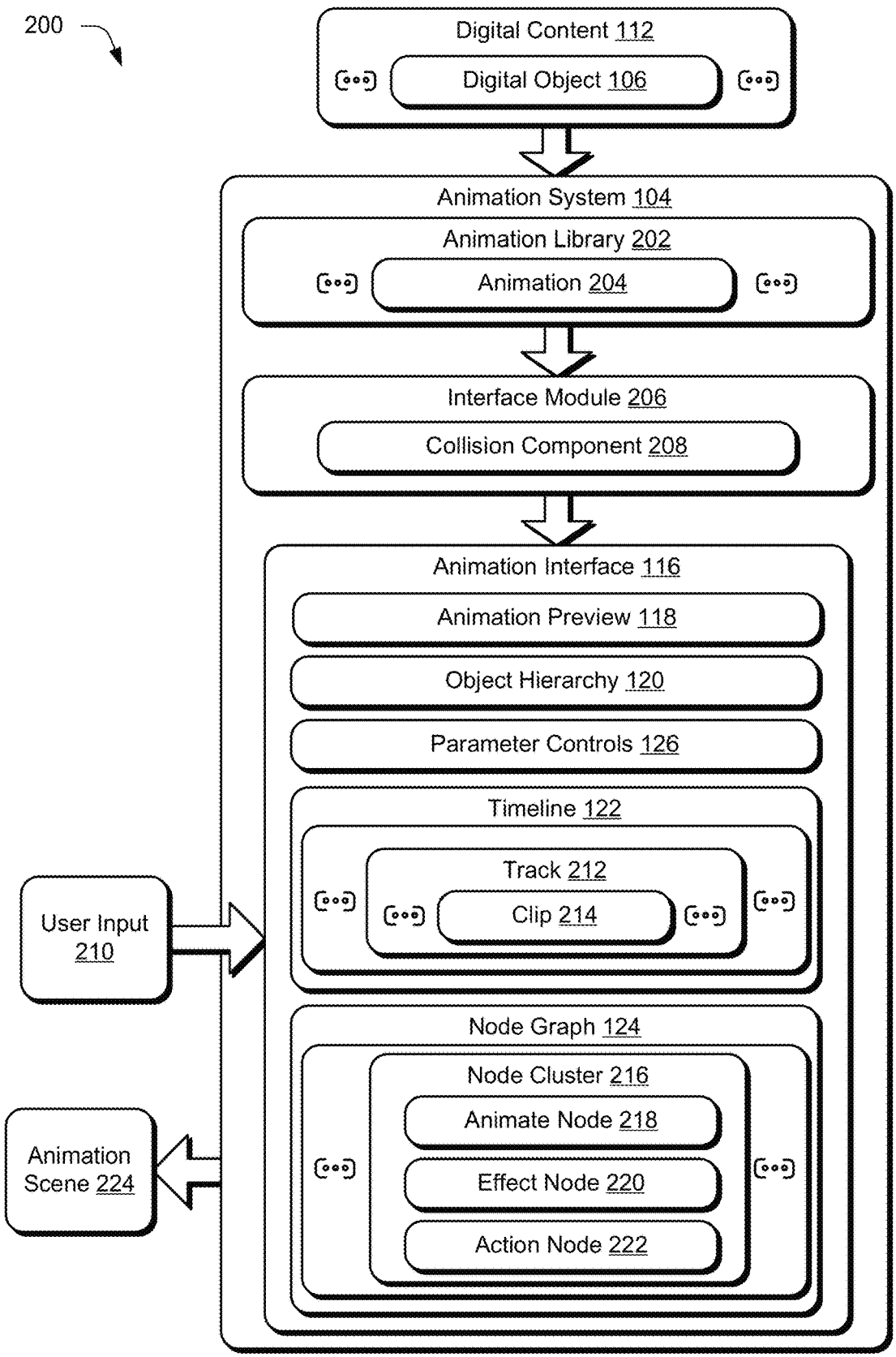
FIG. 2 depicts a digital medium environment showing operation of the animation system of FIG. 1 in greater detail.

FIG. 2 depicts a digital medium environment 200 showing operation of the animation system 104 generating an animation that includes at least one digital object based on input received at an animation interface.

As depicted in FIG. 2, the animation system 104 receives at least one digital object 106 that is to be stylized as a three-dimensional animation. The animation system 104 is further depicted as including an animation library 202. The animation library 202 is representative of a repository of multiple preset animation stylizations. In some implementations, the animation library 202 further includes one or more custom animation stylizations (e.g., one or more custom animation stylizations previously created by a user of the animation system 104 using the node graph 124 portion of the animation interface 116), as described in further detail below. Individual ones of the preset animation stylizations and custom animation stylizations are represented by animation 204, and the animation library 202 is configured to store any number of animations, as indicated by the ellipses adjacent to animation 204. Each animation 204 stored in the animation library 202 is representative of information describing an animation stylization effect that can be applied to a digital object 106, along with one or more parameters that are useable to define an appearance of the animation stylization effect.

For instance, in some implementations animation 204 is representative of a motion path stylization effect that animates an object to move along a specified path in three-dimensional space. In such implementations, animation 204 includes information describing parameters pertaining to the motion path stylization effect, such as a parameter defining the specified path in three-dimensional space, an align axis parameter, a path offset parameter, and a path rotation parameter.

The align axis parameter for the motion path stylization effect is useable to define which axis of the digital object 106 should be aligned to the specified path in three-dimensional space along which the digital object 106 moves during the motion path stylization effect. The path offset parameter for the motion path stylization effect is useable to define a vector that controls a degree by which the digital object 106 is offset from the specified path during the motion path stylization effect. The path rotation parameter is useable to define whether the digital object 106 should rotate to the direction (e.g., tangent) of the specified path when it is moving during the motion path stylization effect. In this manner, the path rotation parameter for the motion path stylization effect defines whether rotation of the digital object 106 remains constant or is controlled separately by a rotate animation effect, as described in further detail below. These example parameters for a motion path stylization effect are merely illustrative and do not exhaustively describe information included in the animation library 202 for an implementation where the animation 204 represents a motion path stylization effect.

As another example, the animation 204 is representative of a scale animation stylization effect that causes the digital object 106 to scale (e.g., change size in three-dimensional object space) from a start scale value to an end scale value. In such implementations, animation 204 includes information describing parameters pertaining to the scale animation stylization effect, such as a parameter defining a start scale value, a parameter defining an end scale value, and a parameter defining a scale center. The start scale parameter for the scale stylization effect defines a size of the digital object 106 (e.g., a percentage value of a size of the 3D mesh 108 for the digital object 106) at which the digital object 106 is displayed upon onset of the scale stylization effect.

The end scale parameter for the scale stylization effect defines a size of the digital object 106 (e.g., a percentage value of a size of the 3D mesh 108 for the digital object 106) at which the digital object 106 is displayed upon completion of the scale stylization effect. The scale center parameter for the scale stylization effect defines a point (e.g., a point in three-dimensional space) around which the digital object 106 is scaled. For instance, the scale center parameter is definable via selection of a predefined point in three-dimensional space or is definable via user input specifying coordinates for a point in three-dimensional space.

As another example, the animation 204 is representative of a bend deformation animation stylization effect that deforms the digital object 106 in a bending manner around a defined point. In such implementations, the animation 204 includes information describing parameters pertaining to the bend deformation stylization effect, such as a bend factor parameter, a bend center parameter, and a bend direction parameter. The bend factor parameter indicates a magnitude specifying an amount by which the digital object 106 bends during animation. The bend center parameter specifies a point in three-dimensional space around which the digital object 106 is bent. In some implementations, the bend center parameter is defined via selection of a predefined point in three-dimensional space or is defined via user input specifying coordinates for a point in three-dimensional space. The bend direction parameter specifies a vector in three-dimensional space along which the digital object 106 is bent, around the bend center point.

As yet another example, the animation 204 is representative of a slow in and slow out animation (e.g., an "easing" animation) that causes one or more other animation stylization effects applied to the digital object 106 to begin gradually and/or end gradually. In such implementations, the animation 204 includes information describing parameters pertaining to the slow in and slow out stylization effect, such as a slow in parameter and a slow out parameter. The slow in parameter defines how gradually an animation transitions from beginning of playback (e.g., at an onset of the styliza-tion effect) to an end speed associated with the animation stylization effect (e.g., a regular speed of the animation stylization effect if unaltered by the slow in and slow out animation stylization effect). The slow out parameter defines how gradually an animation transitions from a playback speed (e.g., a speed of an animation stylization effect during playback if unaltered by the slow in and slow out animation stylization effect) to an end speed. In some implementations, only one of the slow in parameter or the slow out parameter is activated for a slow in and slow out animation stylization effect. Alternatively, when neither the slow in parameter or the slow out parameter is defined or otherwise activated for a slow in and slow out animation stylization effect, the digital object 106 is subject to one or more other animation stylization effects at a normal playback speed associated with each of the other animation stylization effects.

As yet another example, in some implementations the animation 204 represents a squash animation stylization effect, a stretch animation stylization effect, or a combination thereof (e.g., a squash and stretch animation stylization effect). In such implementations, the animation 204 includes information describing parameters pertaining to the squash, stretch, or combination thereof, stylization effect. For instance, parameters pertaining to such an implementation of animation 204 include a scale center parameter, a scale axis parameter, a squash or stretch parameter, a stretch factor parameter, a squash factor parameter, and an interaction with motion path parameter.

The scale center parameter for the squash and stretch stylization effect defines a point (e.g., a point in three-dimensional space) around which the digital object 106 is scaled (e.g., squashed and/or stretched). For instance, the scale center parameter is definable via selection of a predefined point in three-dimensional space or is definable via user input specifying coordinates for a point in three-dimensional space. The scale axis parameter defines an axis in three-dimensional space along which the digital object 106 is squashed and/or stretched. The squash or stretch parameter defines whether a particular animation clip drives squashing or stretching of the digital object 106. In this manner, because an individual animation clip defines either squashing or stretching of the digital object 106, in implementations where a squash and stretch animation is applied to the digital object 106, the squash and stretch animation represents a stylization effect comprised of multiple animation clips (e.g., a stretch clip, a squash clip, and a reversed stretch clip).

The stretch factor parameter defines a magnitude by which the digital object 106 is to be stretched (e.g., elongated) from a default size (e.g., a size of the digital object 106 as defined by its 3D mesh 108). In some implementations, the stretch factor is defined as a numerical value, where a numerical value of one represents the default size of the digital object 106. The squash factor parameter defines a magnitude by which the digital object 106 is to be squashed (e.g., compressed) from a first size to a second size, where the first size corresponds to a size of the digital object 106 at onset of the squash stylization effect and the second size corresponds to a size of the digital object 106 at completion of the squash stylization effect. In implementations where the digital object 106 being animated by the squash and stretch stylization effect is also subject to animation via a motion path stylization effect, the interaction with motion path parameter represents a pause for movement of the digital object 106 along the motion path during which the squash or stretch animation effect occurs. In this manner, the resulting animation simulates how forces applied to the digital object 106 resulting in the squash or stretch animation interact with forces that move the digital object 106 along its defined motion path. In some implementations, the interaction with motion path parameter further defines a "bounce-off speed" that specifies how fast the digital object 106 should enter and exit the pause period while traveling along the defined motion path.

As yet another example, in some implementations the animation 204 represents a follow through animation stylization effect, which changes an amount of a bend deformation stylization effect applied to a digital object 106 based on a movement speed of the digital object 106. Due to the request movement speed of the digital object 106 to trigger the follow through animation, the animation 204 includes information specifying that the digital object 106 subject to animation must also be associated with a motion path animation stylization effect to work properly. In such implementations where the animation 204 represents a follow through stylization effect, the animation 204 additionally includes information describing parameters for the stylization effect, such as a bend center parameter, a bend direction parameter, and a bend factor parameter.

The bend factor parameter indicates a magnitude specifying an amount by which the digital object 106 bends during animation. The bend center parameter specifies a point in three-dimensional space around which the digital object 106 is bent. In some implementations, the bend center parameter is defined via selection of a predefined point in three-dimensional space or is defined via user input specifying coordinates for a point in three-dimensional space. The bend direction parameter specifies a vector in three-dimensional space along which the digital object 106 is bent, around the bend center point.

As yet another example, in some implementations the animation 204 represents an arc animation stylization effect, which deforms a digital object 106 to conform to curvatures of a motion path along which the digital object 106 moves. Due to the request movement of the digital object 106 to trigger the arc animation, the animation 204 includes information specifying that the digital object 106 subject to animation must also be associated with a motion path animation stylization effect to work properly. In such implementations where the animation 204 represents an arc stylization effect, the animation 204 additionally includes information describing parameters for the stylization effect, such as an arc in path parameter. The arc in path parameter defines how the digital object 106 should move along a smooth, curved motion path. In some implementations, the arc path parameter is also represented as a parameter within a motion path stylization effect as a "smoothness" parameter.

As yet another example, in some implementations the animation 204 represents a staging animation stylization effect, which draws a motion trail opposite to a direction of movement for the digital object 106. Due to the request movement of the digital object 106 to trigger the staging animation, the animation 204 includes information specifying that the digital object 106 subject to animation must also be associated with a motion path animation stylization effect to work properly. In such implementations where the animation 204 represents a staging stylization effect, the animation 204 further includes information describing parameters for the staging stylization effect, such as a trail color parameter, a trail transparency parameter, a trail texture parameter, and a staging factor parameter. The trail color parameter is useable to define a color of a motion trail for the digital object 106. The trail transparency parameter is useable to define a transparency value (e.g., an alpha blending value) for the motion trail. The trail texture parameter is useable to define a two-dimensional texture image for the motion trail of the digital object 106. The staging factor parameter is useable to define a length of the motion trail that extends behind the moving digital object 106 as it traverses the corresponding motion path.

As another example, the animation 204 represents an anticipation animation stylization effect that animates the digital object 106 immediately before a subsequent animation stylization effect takes place (e.g., an animation stylization that takes place in anticipation of a subsequent stylization effect). In such implementations where the animation 204 represents an anticipation stylization effect, the animation 204 includes a selectable set of stylization effects and corresponding parameters for each of the selectable stylization effects. For instance, in some implementations a default anticipation stylization effect is set as a bend deformation stylization effect, with corresponding parameters as described above. Other example anticipation stylization effects include a rotate stylization effect, a scale stylization effect, and so forth.

In this manner, the animation library 202 represents a repository of different animation stylization effects, along with their associated parameters and descriptive information, that are selectable for application to a digital object 106. The above-described examples of animations 204 included in the animation library 202 are illustrative and not an exhaustive description of different animation stylization effects included in the animation library 202. In some implementations, the animation 204 represents a custom animation stylization effect defined by a user of the computing device implementing the animation system 104 (e.g., a previously defined custom stylization effect that is subsequently applicable to different digital objects via storage in the animation library 202).

The animation system 104 additionally includes an interface module 206, which is configured to output an animation interface 116 that displays at least one digital object 106 being subject to one or more animations 204. The animation interface 116 includes an animation preview 118, which displays the at least one digital object 106 and a visual representation of the one or more animations 204 applied to the at least one digital object 106. In this manner, the animation preview 118 is configured to display a playback of one or more animation effects applied to the digital object 106, such that a user of the animation system 104 is provided with a visual indication of how a resulting animation will appear during interaction with the animation interface 116.

The animation interface 116 additionally includes an object hierarchy 120, which is representative of a portion that displays one or more digital objects that are selected for inclusion in an animation scene or are available for inclusion in the animation scene being displayed by the animation preview 118. In some implementations, the animation system 104 receives an indication of the digital object 106 via user input selecting the digital object 106 from the object hierarchy 120 portion of the animation interface 116.

To account for implementations where multiple objects are selected for inclusion in an animation scene, the interface module 206 includes a collision component 208. The collision component 208 represents functionality of the animation system 104 to detect scenarios where different objects collide with one another during animation (e.g., due to object movement along respective motion paths during playback of the animation scene). The collision component 208 is configured to monitor for and detect collisions between different digital objects 106 based on the bounding box 110 associated with each digital object 106. For instance, the collision component 208 is configured to determine whether a volume in three-dimensional space, as constrained by the bounding box 110 for a digital object 106 intersects with a volume as constrained by a bounding box 110 for a different digital object 106 during playback of an animation being displayed in the animation interface 116. In response to detecting an object collision, the collision component 208 is configured to identify the two or more objects involved in the collision and output an indication of the colliding objects together with a marker in the timeline 122 that identifies the colliding objects as well as a position during animation playback when the collision occurs. Collision markers generated by the collision component 208 thus include information describing a collision time (e.g., a time after beginning playback of an animation scene during which collision occurs, as well as a contact point in three-dimensional space (e.g., x, y, and z coordinates) for the collision.

The interface module 206 is configured to populate the one or more parameter controls 126 with controls that correspond to parameters for a subject animation 204 being applied to a digital object 106, such as adjustable parameters for the example animation stylization effects described above. In response to detecting user input 210 selecting an animation 204 for use in animating a digital object 106, the interface module 206 identifies parameters associated with the animation 204 and outputs a control for each of the identified parameters in the parameter controls 126 portion of the animation interface 116, as described in further detail below.

The timeline 122 portion includes a display of one or more tracks that collectively define an animation scene. Each track 212 in the timeline 122 includes at least one clip 214, which is a unit of animation assigned to the digital object 106. Clips 214 are arranged relative to a playback timeline for the animation scene, which provides an intuitive overview of when various animation effects are applied to the digital object 106 during playback of the animation. The timeline 122 further enables adjusting (e.g., repositioning and resizing) of individual animation within a track 212 independent of defining any keyframes (e.g., frames that are each associated with a defined animation playback time and individually define an animation state for a digital object being subject to animation). In contrast to conventional animation platforms that use keyframes, which define start and end states of an animation's style, as well as optional waypoints therebetween, individual clips 214 represented in the timeline 122 that define an entire unit of animation (e.g., from start to end) are moveable, adjustable, and otherwise represented as a single interface element. As described in further detail below, properties for a certain animation stylization applied to the digital object 106 are represented as a single clip 214 in the timeline 122, in a manner that enables a user of the animation system 104 to configure timing, duration, and visual appearance of the animation via interaction with the single clip 214.

The animation interface 116 further includes a node graph 124 portion, which is generated and modified in conjunction with the timeline 122, such that modifications made to the timeline 122 propagate to the node graph 124, and vice versa. In some implementations, the node graph 124 portion is displayed in the animation interface 116 alternatively with the timeline 122 portion, such that a user of the animation system 104 switches between views of the timeline 122 and the node graph 124. Alternatively, in some implementations the timeline 122 and the node graph 124 are displayed simultaneously in the animation interface 116.

The node graph 124 includes a node cluster 216 for each animation clip 214 represented in the timeline 122, where various nodes of the node cluster 216 define parameters of the animation clip 214. Individual nodes of a node cluster 216 are editable to define and adjust behaviors of an animation stylization applied to a digital object 106, to create custom new animation stylizations, and combinations thereof. Each node cluster 216 of the node graph 124 defining an animation clip represented in the timeline 122 includes three nodes: an animate node 218, an effect node 220, and an action node 222.

The animate node 218 specifies a function that drives one or more animation effects represented by the animation clip 214 and depicts an animation curve that represents a magnitude (e.g., intensity) of the one or more animation effects as expressed during playback of the animation clip 214. The effect node 220 specifies an animation stylization defined by the node cluster 216, such an animation 204 selected from the animation library 202, a custom animation stylization defined via user input at the node graph 124, or combinations thereof. The action node 222 in the node cluster 216 defines at least one action performed as part of executing the animation stylization expressed during playback of the animation clip 214. Functionality of node clusters 216 and individual nodes of the node graph 124 is described in further detail below. The one or more animations 204 applied to one or more digital objects 106, modified via user input 210 to the animation interface 116 (e.g., user input to at least one of the timeline 122 or the node graph 124), are collectively output by the animation system 104 as an animation scene 224. The animation scene 224 is configured for playback and display by a computing device, such as computing device 102.

Having considered example details of an animation system 104, consider now example details of an animation interface 116 generated by the interface module 206 that is configured to receive user input 210 and facilitate generation of an animation scene 224 using the techniques described herein.

Figure 3:
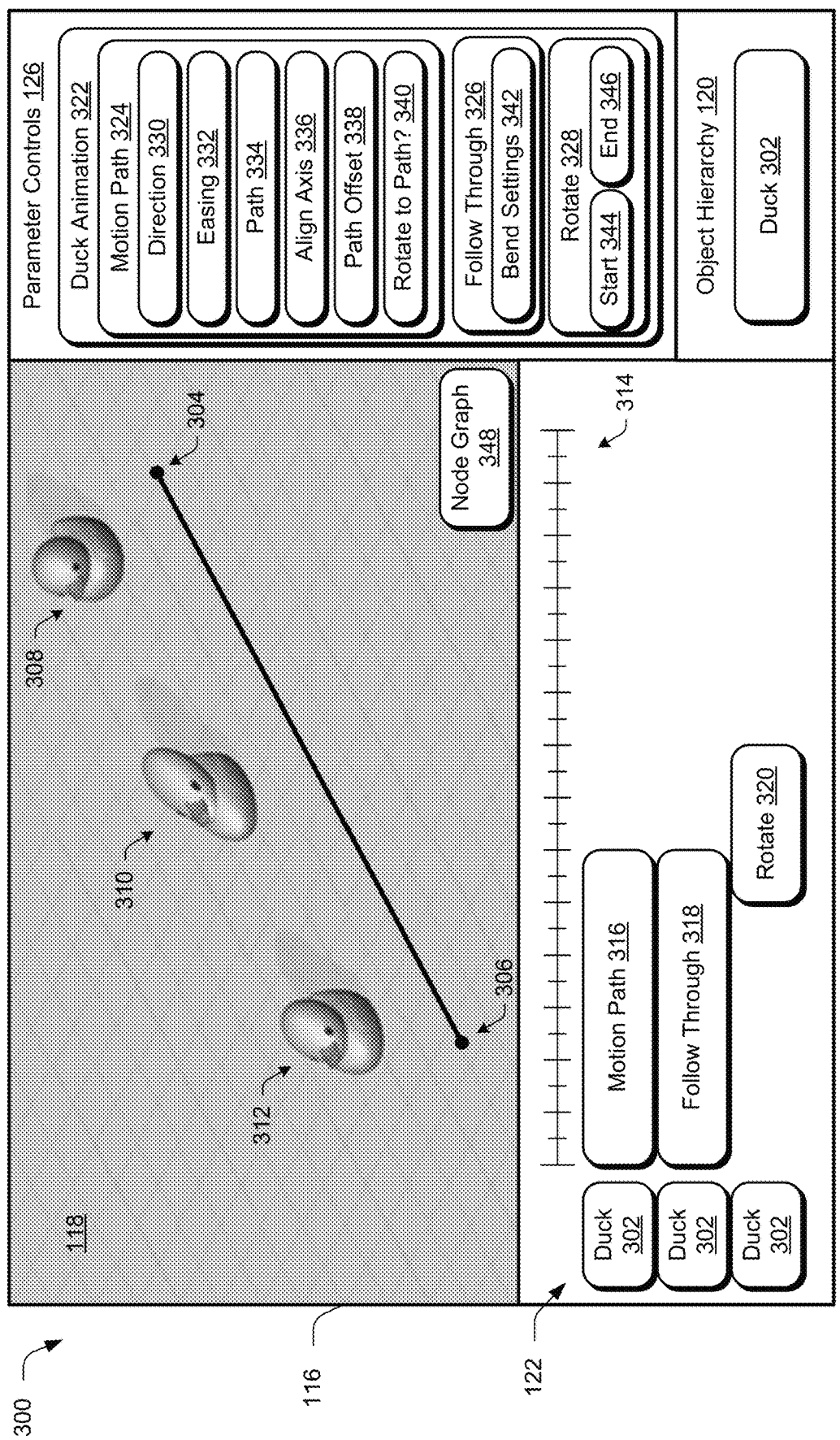
FIG. 3 depicts a digital medium environment showing an example user interface of the animation system of FIG. 1.

FIGS. 3-8 illustrate examples of an animation interface 116 for the animation system 104. Specifically, FIG. 3 depicts a digital medium environment showing an example 300 of the animation interface 116 in accordance with one or more implementations.

In the illustrated example 300, the animation interface 116 is depicted as displaying an animation preview 118, an object hierarchy 120, a timeline 122, and a one or more parameter controls 126 for generating an animation scene 224. Specifically, in the illustrated example 300, the object hierarchy 120 indicates that the animation scene 224 being generated includes a single digital object 106, identified as duck 302. The animation preview 118 depicts how the duck 302 is subject to multiple animation stylization effects during playback of an animation scene being generated using the animation interface 116. For instance, the duck 302 is animated via a motion path stylization effect that causes the duck 302 to move along a path beginning at point 304 and ending at point 306 along the line connecting point 304 and point 306 in three-dimensional space.

As an example, the animation preview 118 displays how the duck 302 is animated from a first position 308, to a second position 310, and subsequently to a third position 312 during animation along the motion path defined by the line connecting point 304 and point 306. In implementations, the animation preview 118 does not display the first position 308, the second position 310 and the third position 312 of the duck 302 simultaneously. Rather, the duck 302 is displayed at a respective one of the first position 308, second position 310, or the third position 312 at corresponding times during a playback preview of the animation scene, such that a user of the animation system 104 is informed as to how a resulting animation scene 224 including the animated duck 302 will appear to a viewer. As such, the simultaneous display of the duck 302 as animated at the first position 308, the second position 310, and the third position 312 is included to illustrate how the animation preview 118 portion of the animation interface 116 visualizes stylization effects applied to one or more digital objects 106.

In some implementations, the animation preview 118 portion of the animation interface 116 includes playback controls (not pictured) that enable a user of the animation system 104 to navigate playback of the animation scene 224. For instance, the animation preview 118 is configured to include play, pause, fast forward, rewind, and similar controls for navigating playback of the animation scene 224, which enables a user of the animation system 104 to preview exactly how an animation scene 224 will appear at any given instance during playback.

The animation interface 116 is further depicted as including a timeline 122 portion, which visually depicts various animation stylization effects that are applied to the duck 302, along with respective playback positions and durations of the various animation stylization effects, to achieve the animation displayed in animation preview 118. For instance, in the illustrated example 300 the timeline 122 includes line 314 that represents the passage of time during which playback of the animation scene 224 occurs (e.g., a timeline), such that animation clips represented in the timeline 122 are arranged chronologically relative to one another.

Specifically, the action node 222 includes animation clip 316, animation clip 318, and animation clip 320. Animation clip 316 indicates that the duck 302 is subject to a motion path animation stylization effect (e.g., movement along the motion path defined by the line connecting point 304 and point 306) beginning at an onset of playback of the animation scene 224 and spanning a duration indicated by a size of the animation clip 316 spanning a distance relative to the line 314 (e.g., a horizontal size of the animation clip 316 as depicted in the illustrated example 300).

Animation clip 318 indicates that the duck 302 is also subject to a follow through animation stylization effect during movement along the motion path of animation clip 316. An appearance of the duck 302 as subject to the follow through animation stylization effect is displayed in the animation preview 118 by bending the duck 302 at different magnitudes during travel along the motion path (e.g., the duck 302 is subject to additional bending when displayed at the second position 310 relative to the first position 308 during playback of the animation scene 224). Animation clip 320 indicates that the duck 302 is subject to a rotation animation stylization effect that begins during the respective stylization effects represented by animation clip 316 and animation clip 318 and continues after completion thereof (e.g., the duck 302 begins rotating after reaching the third position 312, but prior to reaching the point 306, and continues rotating after reaching point 306 for a duration indicated by a width of the animation clip 320 as displayed in the timeline 122). In this manner, the animation clip 316, the animation clip 318, and the animation clip 320 collectively define an animation track for the animation scene 224. Although illustrated as including a single digital object 106 subject to various animation stylization effects grouped in a single track, the animation scene 224 is representative of an animation scene that includes any number of digital objects 106 subject to any number of animation clips, respectively grouped by any number of tracks. In this manner, the techniques described herein are useable to create simple animations of a single digital object 106 as well as complex animations that are not so limited to the illustrated and described examples.

The animation interface 116 is additionally depicted as displaying parameter controls 126 for each of the animation clips depicted in the timeline 122. For instance, the parameter controls 126 are depicted as pertaining to group 322, with group 322 specifying that the included parameter controls collectively define a "duck animation." Within group 322, the parameter controls 126 include control set 324, control set 326, and control set 328. Individual controls of each control set are populated by the interface module 206 based on information described by a corresponding animation 204 for the clip represented in the timeline 122.

For instance, control set 324 indicates that the controls included therein pertain to the motion path animation clip 316. As such, the control set 324 includes a control 330 that is selectable to define a direction parameter for the motion path stylization effect (e.g., a direction that the duck 302 travels along the line connecting point 304 and point 306). Control set 324 additionally includes a control 332 configured to receive input defining one or more easing (e.g., slow in, slow out) parameters for motion of the duck 302 along the motion path). Control 334 is configured to receive input defining the motion path itself. For instance, control 334 is useable to adjust a position of point 304, a position of point 306, or a geometry of the line connecting point 304 and point 306. Alternatively or additionally, control 334 is useable to replace the motion path illustrated in the animation preview 118 with a preconfigured geometry (e.g., a circle, a square, an ellipses, a star, a triangle, and so forth). Alternatively or additionally, control 334 is useable to define a freeform path connected by two or more vertices in three-dimensional space. Alternatively or additionally, control 334 is useable to designate whether the digital object 106 should move in a loop (e.g., repeat) the defined motion path.

Control 336 is configured to receive input defining an align axis parameter for the motion path stylization effect, control 338 is configured to receive input defining a path offset parameter for the motion path stylization effect, and control 340 is configured to receive input defining a path rotation parameter for the motion path stylization effect. In this manner, the interface module 206 populates the control set 324 with controls that are individually selected based on information stored in a corresponding motion path animation 204 and useable to customize an appearance of the duck 302 when subject to the motion path animation clip 316.

In a similar manner, control set 326 and control set 328 include controls that are useable to define parameters corresponding to the follow through animation clip 318 and the rotate animation clip 320, respectively. Specifically, control set 326 includes at least one control 342 configured to define bend setting parameters for the follow through animation stylization effect. Control set 328 includes a control 344 for defining a start vector in three-dimensional space along which the duck 302 is oriented at the onset of the rotate stylization effect as well as a control 346 for defining an end vector in three-dimensional space along which the duck 302 is oriented at completion of the rotate stylization effect.

Figure 4:
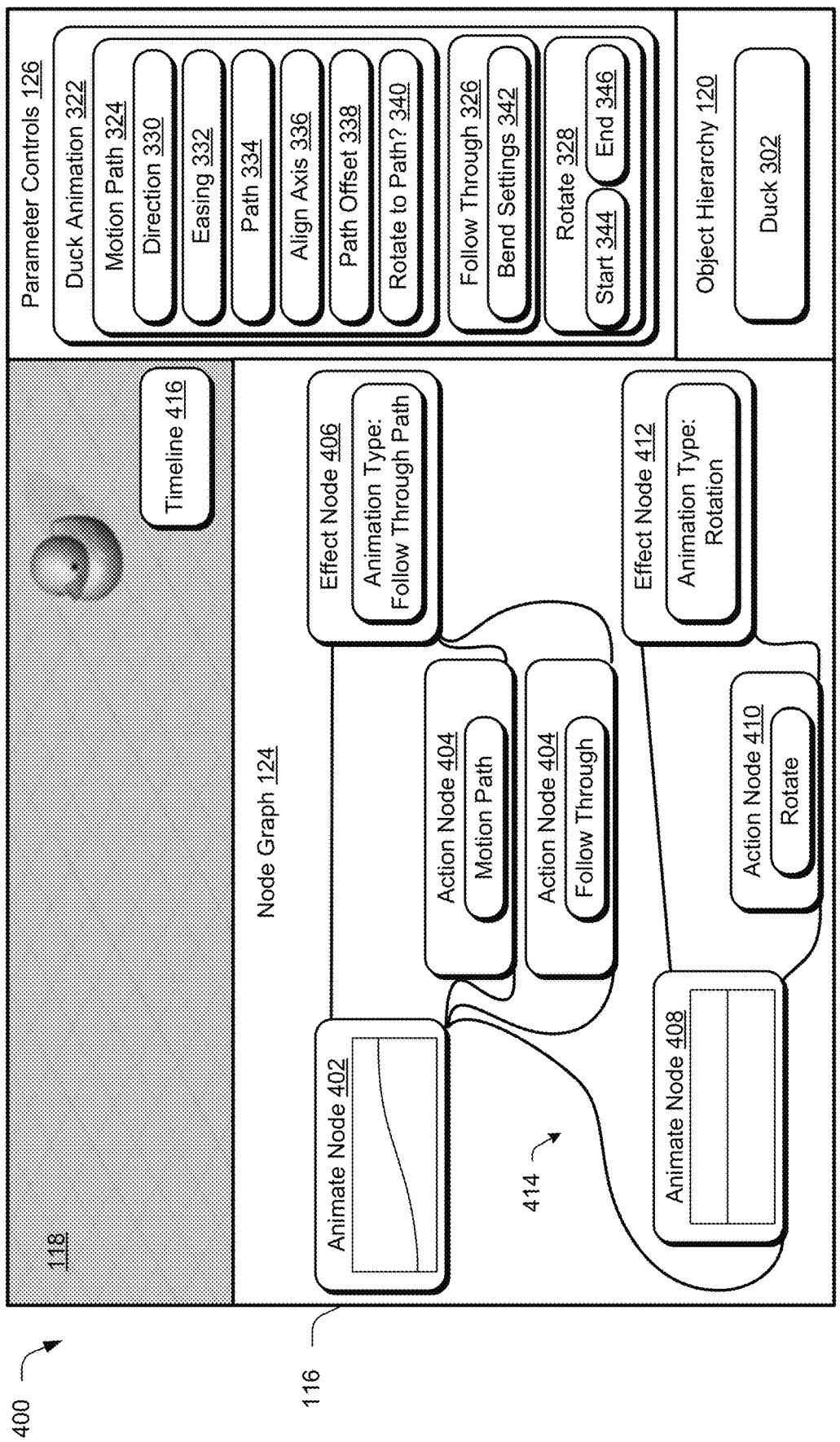
FIG. 4 depicts a digital medium environment showing an example user interface of the animation system of FIG. 1.

In some implementations, the animation interface 116 includes a simultaneous display of the timeline 122 and the node graph 124 portions. However, in the illustrated example 300, the timeline 122 is displayed as an alternative to the node graph 124. Consequently, the animation interface 116 includes a selectable option 348 to transition from a view of the timeline 122 to a view of the node graph 124. FIG. 4 depicts a digital medium environment showing an example 400 of the animation interface 116 displayed responsive to user input 210 selecting the selectable option 348 of FIG. 3.

In the illustrated example 400, the animation interface 116 is updated to display the node graph 124 in place of the timeline 122 (e.g., responsive to detecting user input 210 at the selectable option 348). The node graph 124 is illustrated as including two node graph clusters, which collectively represent the animation stylization effects displayed in the timeline 122 of FIG. 3. Specifically, node graph 124 includes a first node cluster comprised of node 402, node 404, and node 406, and a second node cluster comprised of node 408, node 410, and node 412. In the first node cluster, node 402 is an animate node specifying a function that drives the duck 302 to move along the path defined by the line connecting point 304 and point 306, having a visual effect represented by the animation clip 316 and animation clip 318. As a graphical representation of the motion path and follow through stylization effects, node 402 depicts an animation curve that represents a magnitude of the stylization effects as applied on the duck during playback of the animation scene. This animation curve visually indicates how the duck 302 moves at a consistent speed along the motion path and is subject to a follow through stylization effect that begins gradually at onset of the motion path, then increases in magnitude, and subsequently decreases in magnitude as the duck 302 approaches point 306.

In the second node cluster, node 408 is an animate node specifying a function that drives the duck 302 to rotate during a playback time represented by the animation clip 320 in the timeline 122 of FIG. 3. As a graphical representation of the rotate effect, node 408 includes an animation curve that represents a magnitude of the rotate stylization effect over time. Depicted as a horizontal line, the animation curve of node 408 indicates that the animation clip 320 causes the duck 302 to rotate at a uniform rate (e.g., a consistent speed).

The animate nodes of the respective node clusters (e.g., node 402 and node 408) are each configured to receive user input modifying a geometry of the animation curve (e.g., user input selecting one or more points along the curve and dragging the selected points to different positions). In response to user input modifying a geometry of the animation curve, the animation system 104 modifies parameters defining one or more animation stylization effects represented by the animation curve. For instance, in an example implementation where user input is received at node 408 modifying the depicted animation curve from a straight line to an oscillating wave (e.g., a geometry resembling a sine wave), the animation system 104 modifies at least one parameter of the animation clip 320 that dictates a rotational speed of the animation clip 320 such that the duck rotates at an oscillating frequency, rather than the consistent rate represented by the horizontal line of the animation curve depicted in FIG. 4.

The action node 404 defines that a motion path stylization effect and a follow through stylization effect are applied to the duck 302 during playback of the animation clip. Similarly, action node 410 defines that a rotation stylization effect is applied to the duck 302 during playback of the corresponding animation clip. In implementations, action nodes (e.g., node 404 or node 410) are useable to alter one or more stylization effects applied to a digital object 106, or corresponding parameters thereof.

For example, node 404 is configured to receive user input defining a different stylization effect to be expressed by the node 404. For instance, the node 404 is configured to enable user input that replaces the follow through stylization effect with a squash and stretch. In response to such a replacement, the animation system 104 is configured to modify the timeline 122 to indicate the replaced stylization effect. Modifying the timeline 122 based on input received at the node graph 124, and vice versa, is described in further detail below. In response to detecting user input selecting the node 404, the interface module 206 is configured to visually emphasize corresponding ones of the parameter controls 126. For instance, in response to detecting input selecting a portion of the node 404 corresponding to the motion path, the interface module 206 is configured to visually emphasize (e.g., highlight) the control set 324 to indicate that its included parameter controls are useable to modify parameters for the selected motion path stylization effect.

Node 406 is an effect node that specifies an animation stylization defined by the node cluster of node 402, node 404, and node 406. Specifically, node 406 defines that the motion path and follow through stylization effects, along with their respective parameters, that cause the duck 302 to move along the line connecting point 304 and point 306 is a "Follow Through Path" animation stylization. Similarly, node 412 defines that the rotation effect represented by the node cluster including node 408, node 410, and node 412 is a "Rotation" animation stylization. The effect nodes (e.g., node 406 and node 412) are each configured to receive user input changing a name of the corresponding animation stylization represented by the respective node cluster. In this manner, the effect nodes enable defining custom animation stylization effects and saving custom animation stylization effects for later use (e.g., via storage in the animation library 202).

To visually represent how different nodes are related to one another, various nodes are connected by lines, such as by line 414 connecting node 402 to node 408. Lines connecting node 402 with node 404 and node 406, and those connecting node 404 with node 406, form a closed loop indicating that nodes 402, 404, and 406 form a node cluster. Line 414 indicates that the animation stylization effect defined by the node cluster of nodes 402, 404, and 406 drives the animation stylization effect defined by the node cluster of nodes 408, 410, and 412, such that the Follow Through Path stylization effect occurs prior to the Rotation stylization effect during playback of the animation scene. The animation interface 116 further includes a selectable option 416 to transition from viewing the 124 to viewing the timeline 122. Advantageously, updates made to the timeline 122 are reflected in changes to the node graph 124, and vice versa, thus providing a user of the animation system 104 with sophisticated controls for generating an animation scene. For a further description of how updates are propagated between the timeline 122 and node graph 124, consider FIGS. 5 and 6.

Figure 5:
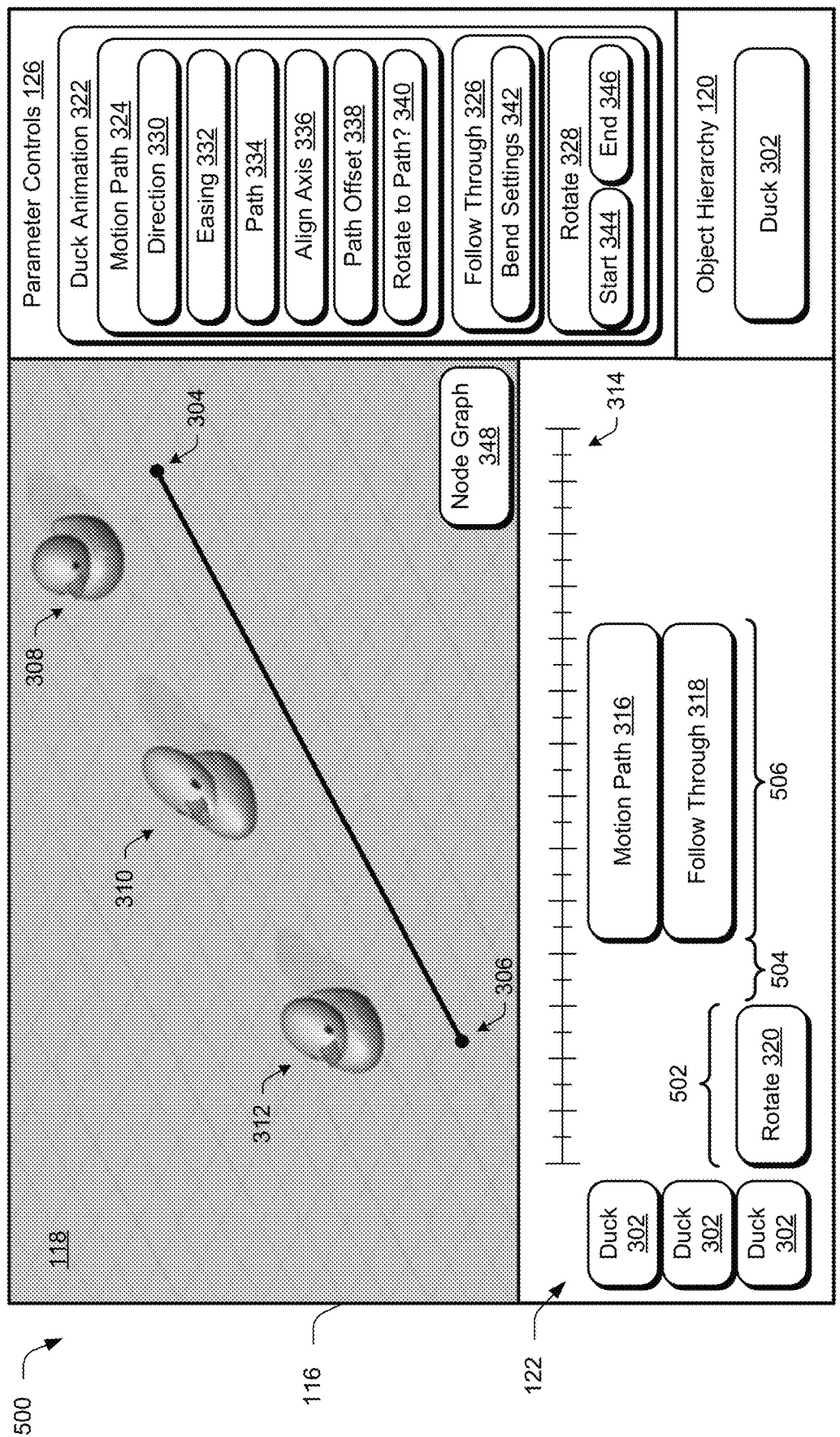
FIG. 5 depicts a digital medium environment showing an example user interface of the animation system of FIG. 1.
Figure 6:
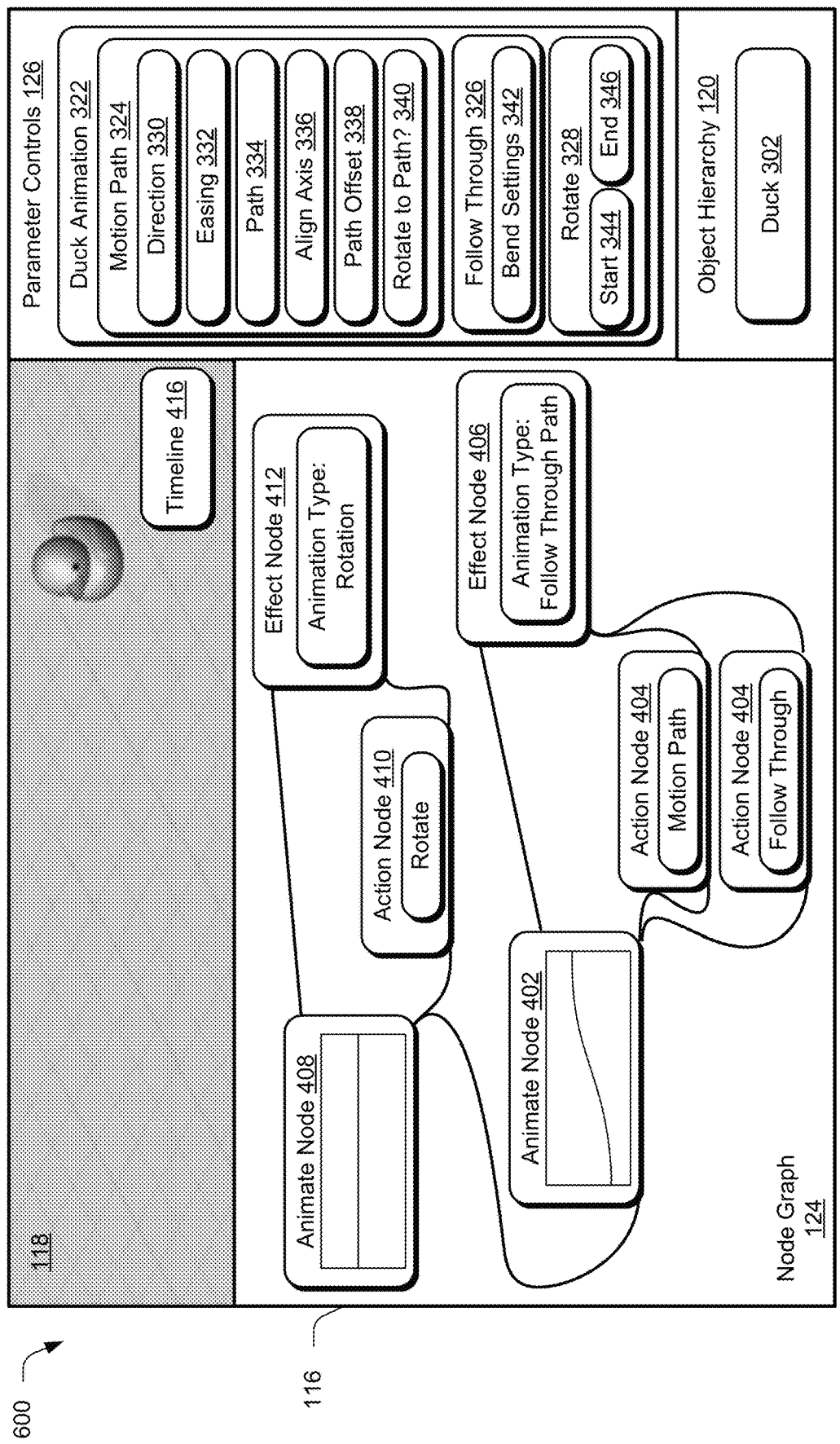
FIG. 6 depicts a digital medium environment showing an example user interface of the animation system of FIG. 1.

FIG. 5 depicts a digital medium environment showing an example 500 of the animation interface 116 in an implementation where user input 210 modifies at least one aspect of the animation interface 116 as depicted in the illustrated example 300. FIG. 6 depicts a digital medium environment showing an example 600 of the animation interface 116 in an implementation where user input modifying the timeline 122 is propagated to cause changes in the node graph 124.

The illustrated example 500 depicts a scenario where user input 210 adjusts respective positions of the animation clip 316, animation clip 318, and animation clip 320 relative to the line 314, thus altering a chronological order of the animation stylization effects applied to the duck 302 during playback of the animation scene. Specifically, the illustrated example 500 depicts a scenario where the animation clip 320 is moved to begin at the onset of animation playback, such that the animation scene begins with duck 302 rotating at point 304. The duck 302 continues to rotate at point 304 for a duration represented by a length of bracket 502, which spans a distance relative to the 314. After completion of the rotation stylization effect, playback of the animation scene continues for a duration represented by a length of bracket 504 where no animation stylization effect is applied to the duck 302. After playback has reached a duration defined by the aggregate lengths of bracket 502 and bracket 504, the Follow Through Path stylization effect represented by animation clip 316 and animation clip 318 causes the duck to move from point 304 to point 306 over a duration represented by a length of bracket 506.

In response to receiving user input 210 altering the timeline 122 (e.g., user input 210 changing the timeline 122 from the illustrated example 300 to the illustrated example 500), the interface module 206 updates the node graph 124 to reflect these changes, and vice versa. For instance, in the illustrated example 600, the node graph 124 is modified to depict the respective changes made to the timeline 122 portion of the animation interface 116 as illustrated in FIG. 5. Specifically, in the illustrated example 600, the node cluster comprising node 408, node 410, and node 412 is repositioned relative to the node cluster comprising node 402, node 404, and node 406. This node cluster repositioning represents how the Rotation animation stylization effect represented by animation clip 320 was modified to precede the Follow Through Path animation stylization effect represented by animation clip 316 and animation clip 318 during playback of the animation scene.

In a similar manner, the node graph 124 is configured to enable repositioning of various nodes (e.g., via user input 210) and their connecting lines, which effects animation scene modifications that are propagated to the timeline 122. For instance, in response to user input 210 adjusting a position and connection of the node clusters illustrated in FIG. 4 to the arrangement illustrated in FIG. 6, the interface module 206 is configured to modify the timeline 122 from the illustrated example of FIG. 3 to that of FIG. 4. Thus, the interface module 206 monitors changes resulting from user input 210 to each of the timeline 122 and node graph 124 portions of the animation interface 116 and propagates modifications made in one portion to the other. In addition, to assist users in creating sophisticated animation scenes, the interface module 206 is configured to monitor for collisions between two or more objects during creation of an animation scene.

Figure 7:
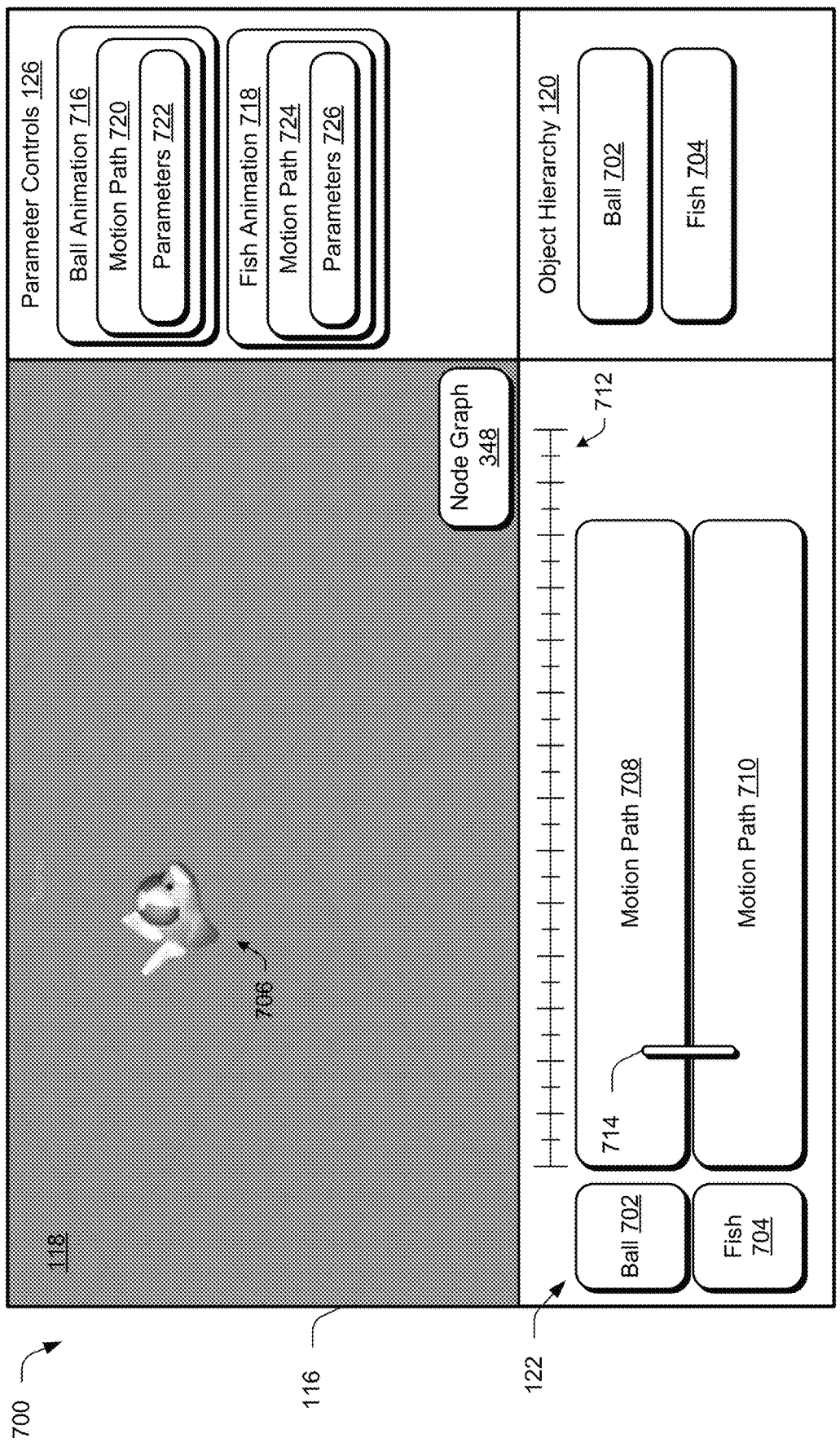
FIG. 7 depicts a digital medium environment showing an example user interface of the animation system of FIG. 1.

FIG. 7 depicts a digital medium environment showing an example 700 of the animation interface 116 in which an animation scene including multiple digital objects is created. In the illustrated example 700, the object hierarchy 120 portion of the animation interface 116 indicates that the animation scene being created includes two digital objects: a ball 702 and a fish 704. The animation preview 118 depicts a playback portion of the animation scene during which a collision 706 between the ball 702 and the fish 704 occurs. The timeline 122 indicates that the ball 702 is animated via animation clip 708, which identifies that the ball 702 is affected by a motion path animation stylization effect. Similarly, the timeline 122 indicates that the fish 704 is animated via animation clip 710, which identifies that the fish 704 is affected by another motion path animation stylization effect. The respective motion path stylization effects represented by animation clip 708 and animation clip 710 are depicted as spanning a common duration during playback of the animation scene, as indicated by their visual indications in the timeline 122 spanning a common distance relative to the line 712.

The timeline 122 further includes a collision marker 714, which serves as a visual indicator that a collision between the ball 702 and the fish 704 occurs during playback of the animation scene at a playback duration indicated by a position of the collision marker 714 relative to the line 712. For instance, the respective geometries of the motion paths animating the ball 702 and the fish 704 cause the respective geometries of the three-dimensional digital objects to intersect with one another during playback of the animation scene, as depicted by collision 706. However, because only motion path stylization effects are applied to the ball 702 and fish 704, the collision 706 appears unnatural, with the ball 702 and fish 704 passing through one another without deformation or deflection as would otherwise occur for objects colliding in the real world.

The parameter controls 126 similarly represent how only motion path animation stylization effects are applied to each of the ball 702 and fish 704, with group 716 including parameter controls for the ball 702 and group 718 including parameter controls for the fish 704. In group 716, control set 720 includes controls 722 for one or more parameters defining the motion path animation clip 708. Likewise, in group 718, control set 724 includes controls 726 for one or more parameters defining the motion path animation clip 710.

In addition to identifying a playback position during which the collision 706 occurs, the collision marker 714 is configured to indicate which digital objects 106 are involved in the collision 706. For instance, by visually overlapping both the animation clip 708 and animation clip 710 as represented in the timeline, the collision marker 714 indicates that the ball 702 and fish 704 are digital objects involved in the indicated collision. The interface module 206 is configured to format the collision marker 714 in any suitable manner that identifies the collision 706. For instance, in some implementations the collision marker 714 is color coded based on colors of respective digital objects involved in the collision. Alternatively or additionally the collision marker 714 is configured so that user input selecting (e.g., touching, clicking, hovering over, etc.) the collision marker 714 causes the animation interface 116 to display information describing the collision, such as a description of digital objects involved in the collision, a point in three-dimensional space at which the collision occurs, a playback duration at which the collision occurs, and so forth.

Given this information identifying a collision between two or more digital objects, a user of the animation system 104 is informed as to when and where additional animation stylization effects are useful to create a more realistic animation scene. 800

Figure 8:
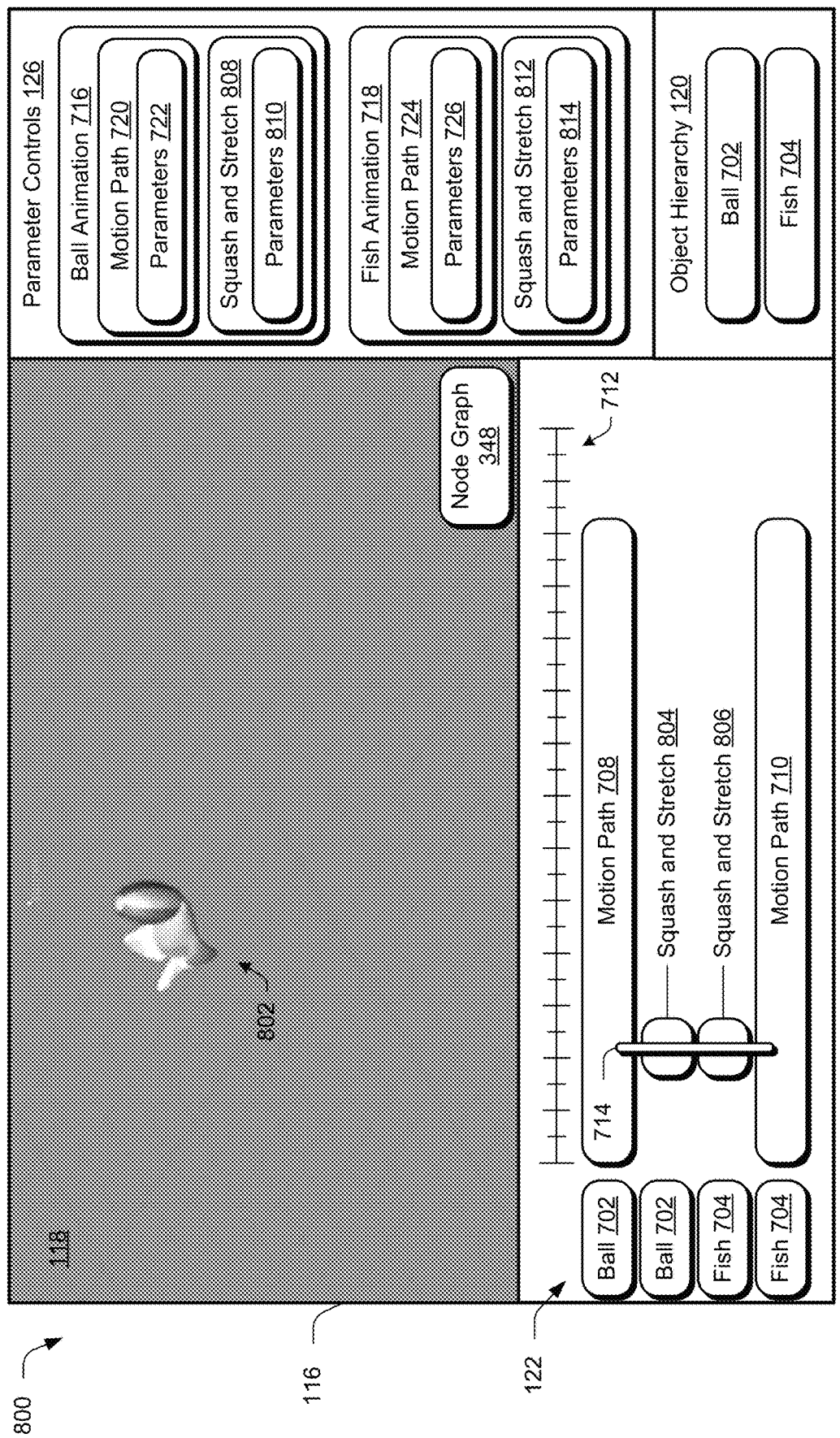
FIG. 8 depicts a digital medium environment showing an example user interface of the animation system of FIG. 1.

FIG. 8 depicts a digital medium environment showing an example 800 of the animation interface 116 in which an animation scene animation stylization effects are added at a timeline position indicated by a collision marker to create a realistic animation scene. In the illustrated example 800, collision 802 represents an instance of collision 706, where ball 702 and fish 704 are further modified using animation clip 804 and animation clip 806, respectively, to create an animation scene that realistically depicts a collision between the ball 702 and the fish 704. Specifically, animation clip 804 and animation clip 806 each represent a squash and stretch stylization effect applied to the respective digital object, in a manner that mimics forces applied via impact when the ball 702 and fish 704 travel their respective motion paths. The collision marker 714 enables a user of the animation system 104 to conveniently identify an appropriate playback location for positioning the squash and stretch animation effects in the timeline 122, as well as information regarding parameters (e.g., collision point) for defining the squash and stretch animation effect.

In response to the animation clip 804 and animation clip 806 being added to the timeline 122, the interface module 206 updates the parameter controls 126 to display additional controls for defining the squash and stretch animation clips. For instance, the parameter controls 126 are updated to include set 808 in the group 716, which includes controls 810 for one or more parameters of the squash and stretch animation clip 804 applied to the ball 702. Similarly, the parameter controls 126 are updated to include set 812 in the group 718, which includes controls 814 for one or more parameters of the squash and stretch animation clip 806 applied to the fish 704. The animation system 104 is thus configured to provide an intuitive animation interface 116 that enables even inexperienced users to create complex animation scenes using preset animation stylization effects, custom animation stylization effects generated via the animation interface 116, or combinations thereof.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-8.

FIG. 9 is a flow diagram depicting a procedure 900 in an example implementation of generating an animation scene using an animation interface that includes a timeline portion and a node graph portion for defining the animation scene. To begin, input identifying a three-dimensional object is received (block 902). The animation system 104, for instance, detects user input identifying a digital object 106 (e.g., duck 302, ball 702, fish 704, combinations thereof, etc.) to be included in an animation scene. In some implementations, the input is received as user input 210 selecting the digital object 106 from a list of digital objects presented as available for inclusion in an object hierarchy 120 portion of an animation interface 116.

An animation interface configured for generating an animation scene depicting an animation of the three-dimensional digital object is then generated (block 904). The interface module 206, for instance, generates the animation interface 116. As part of generating the animation interface, a timeline portion that includes at least one track defining the animation scene is generated, where the at least one track includes one or more clips that each represent an animation stylization effect applied to the three-dimensional digital object (block 906). The interface module 206, for instance, generates the timeline 122 to include a track that includes animation clip 316, animation clip 318, and animation clip 320 that collectively define an animation scene for animating the duck 302 in accordance with the illustrated example of FIG. 3.

As part of generating the animation interface, a node graph portion that includes a node cluster for each of the one or more clips represented in the timeline portion is generated, where each node cluster includes an animate node, an effect node, and an action node (block 908). The interface module 206, for instance, generates the node graph 124 to include a first node cluster including node 402, node 404, and node 406 and a second node cluster including node 408, node 410, and node 412. The first and second node clusters represent animation scene for animating the duck 302 in accordance with the illustrated example of FIG. 4.

As further part of generating the animation interface, a parameter controls portion that displays at least one control configured to modify a parameter for a stylization effect applied to the three-dimensional digital object is generated (block 910). The interface module 206, for instance, generates the parameter controls 126 to include controls for respective parameters of each of the animation stylization effects represented in the timeline 122 and the node graph 124 as being applied to the one or more digital objects selected for inclusion in the animation scene.

Input modifying at least one parameter of a stylization effect applied to the three-dimensional digital object is received (block 912). The animation system 104 for instance, receives user input 210 at one or more of the timeline 122, the node graph 124 or the parameter controls 126 modifying a parameter associated with one or more of the animation clips applied to the digital object 106 during playback of the animation scene. The animation interface is then updated based on the input modifying the at least one parameter of the stylization effect applied to the three-dimensional object (block 914). The interface module 206, for instance, updates the timeline 122 based on input received at the node graph 124 modifying the at least one parameter of the stylization effect. Alternatively or additionally, the interface module 206 updates the node graph 124 based on input received at the timeline 122 modifying the at least one parameter of the stylization effect. Alternatively or additionally, the interface module 206 updates both the timeline 122 and the node graph 124 based on input received at the parameter controls 126 modifying the at least one parameter of the stylization effect.

The animation scene generated via the animation interface is then output (block 916). The animation system 104, for instance, outputs animation scene 224 as including at least one digital object 106 and one or more animations 204 applied to the at least one digital object 106, together with parameters specifying a particular manner in which each animation 204 is applied to the digital object 106. The animation scene 224 is configured for playback on a computing device, such as via display by a display device of the computing device 102.

Having described example procedures in accordance with one or more implementations, consider now an example system and device to implement the various techniques described herein.

Example System and Device

Figure 10:
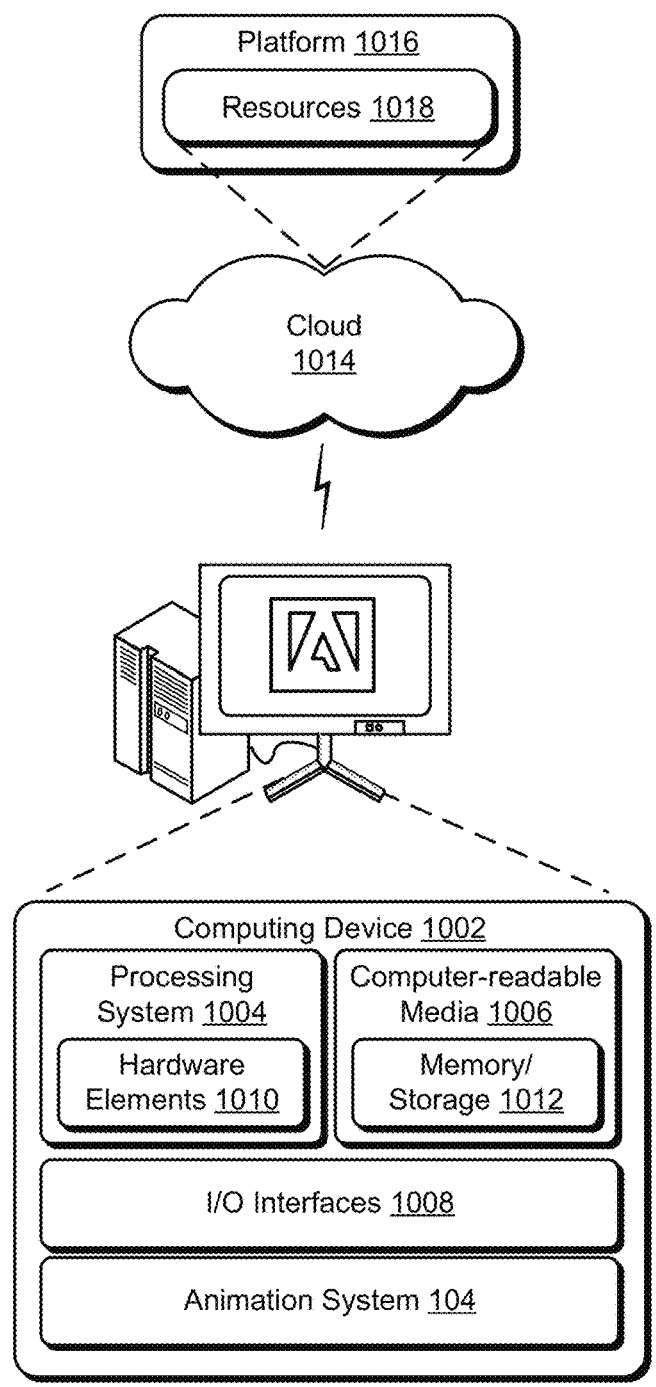
FIG. 10 illustrates an example system including components of an example device configured to implement techniques described with reference to FIGS. 1-9.

FIG. 10 illustrates an example system 1000 that includes an example computing device 1002, which is representative of one or more computing systems and/or devices that implement the various techniques described herein. This is illustrated through inclusion of the animation system 104. The computing device 1002 is configured, for example, as a service provider server, as a device associated with a client (e.g., a client device), as an on-chip system, and/or as any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that are configurable as processors, functional blocks, and so forth. For instance, hardware element 1010 is implemented in hardware as an application specific integrated circuit or other logic device formed using one or more semiconductors. The hardware elements 1010 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1006 is illustrated as including memory/storage 1012. The memory/storage 1012 represents memory/storage capacity associated with one or more computer-readable media. The memory/storage 1012 is representative of volatile media (such as random-access memory (RAM)) and/or nonvolatile media (such as read only memory (ROM), Flash memory, optical disks, magnetic disks, and so forth). The memory/storage 1012 is configured to include fixed media (e.g., RAM, ROM, a fixed hard drive, and so on) as well as removable media (e.g., Flash memory, a removable hard drive, an optical disc, and so forth). In certain implementations, the computer-readable media 1006 is configured in a variety of other ways as further described below.

Input/output interface(s) 1008 are representative of functionality to allow a user to enter commands and information to computing device 1002 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1002, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is further configured to be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that is utilized while computer processing is executed on servers that are remote from the computing device 1002. Resources 1018 also include services provided over the Internet and/or through a subscriber network, such as a cellular or Wi-Fi network.

The platform 1016 is configured to abstract resources and functions to connect the computing device 1002 with other computing devices. The platform 1016 is further configured to abstract scaling of resources to provide a corresponding level of scale to encountered demand for the resources 1018 that are implemented via the platform 1016. Accordingly, in an interconnected device embodiment, implementation of functionality described herein is configured for distribution throughout the system 1000. For example, in some configurations the functionality is implemented in part on the computing device 1002 as well as via the platform 1016 that abstracts the functionality of the cloud 1014.

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
receiving input identifying a three-dimensional digital object;
generating an animation interface that is useable to create an animation scene depicting an animation of the three-dimensional digital object, the animation interface including:
a timeline portion comprising a clip that visually renders an animation stylization effect applied to the three-dimensional digital object, the clip spanning a direction along a timeline; and
a node graph portion comprising a node cluster representing the clip, the node cluster including an animate node, an effect node, and an action node;
receiving input at the timeline portion of the animation interface modifying at least one parameter of the animation stylization effect to create a modified animation stylization effect that defines how the three-dimensional digital object is visually modified or manipulated during playback of the animation scene; and
modifying the node graph portion based on the input at the timeline portion of the animation interface by updating at least one node of the node cluster to describe the modified animation stylization effect.

2. The method of claim 1, the animation interface further including a parameter controls portion that defines the at least one parameter of the animation stylization effect and includes at least one control that is selectable to modify the at least one parameter of the animation stylization effect, the at least one control being populated based on a type of the animation stylization effect represented by the clip.

3. The method of claim 1, the animation interface further including an object hierarchy portion that identifies the three-dimensional digital object included in the animation scene, wherein the input identifying the three-dimensional digital object comprises input selecting the three-dimensional digital object from the object hierarchy portion.

4. The method of claim 1, wherein the clip in the timeline portion represents the animation stylization effect independent of a keyframe that is associated with a defined animation playback time and describes an animation style of the three-dimensional digital object at the defined animation playback time.

5. The method of claim 1, wherein the animate node specifies a function that drives the animation stylization effect represented by the clip.

6. The method of claim 1, wherein the animate node includes a depiction of an animation curve for the animation stylization effect, the animation curve representing a magnitude of the animation stylization effect as expressed on the three-dimensional digital object relative to a playback duration of the clip.

7. The method of claim 1, wherein the effect node specifies an animation stylization effect defined by the node cluster and is configured to receive input defining a name of the animation stylization effect for storage in an animation library.

8. The method of claim 1, wherein the action node in the node cluster includes information describing at least one action performed as part of executing the animation stylization effect during playback of the animation scene.

9. The method of claim 1, further comprising outputting the animation interface as simultaneously displaying the timeline portion and the node graph portion.

10. The method of claim 1, the animation interface further comprising an animation preview portion that visually depicts the animation scene and includes controls configured to navigate playback of the animation scene.

11. The method of claim 1, wherein the clip is generated as having a size based on a playback duration of the animation stylization effect such that the size spans the direction along the timeline to indicate the playback duration of the animation stylization effect, the clip further providing a visual indication of the three-dimensional digital object and the animation stylization effect with which the clip is associated.

12. The method of claim 1, wherein the input at the timeline portion of the animation interface modifying the at least one parameter of the animation stylization effect comprises input adjusting a size of the clip relative to the timeline and modifying the node graph portion to describe the modified animation stylization effect comprises modifying a parameter playback duration of the animation stylization effect in the animate node.

13. The method of claim 1, wherein the input at the timeline portion of the animation interface modifying the at least one parameter of the animation stylization effect comprises input adjusting a position of the clip relative to the timeline and modifying the node graph portion to describe the modified animation stylization effect comprises modifying a parameter representing a start time and a parameter representing an end time for the animation stylization effect in the animate node.

14. The method of claim 1, further comprising detecting a collision between the three-dimensional digital object and at least one other three-dimensional digital object during playback of the animation scene and updating the timeline portion to display a collision marker at a playback position during which the collision occurs in the animation scene.

15. The method of claim 14, wherein the collision marker includes a visual indicator of the three-dimensional digital object, a visual indicator of the at least one other three-dimensional digital object, and information describing a point in three-dimensional space at which the collision occurs in the animation scene.

16. The method of claim 14, wherein detecting the collision between the three-dimensional digital object and the at least one other three-dimensional digital object comprises monitoring a position of a volume in three-dimensional space defined by a bounding box for the three-dimensional digital object and a position of a volume in the three-dimensional space defined by a bounding box for the at least one other three-dimensional digital object and is performed responsive to identifying an intersection between the volume defined by the bounding box for the three-dimensional digital object and the volume defined by the bounding box for the at least one other three-dimensional digital object.

17. A computer-readable storage medium storing executable instructions, which when executed by a processing device, cause the processing device to perform operations comprising:
  receiving input identifying a three-dimensional digital object;
  generating an animation interface that is useable to generate an animation scene depicting an animation of the three-dimensional digital object, the animation interface including:
    a timeline portion comprising a clip that visually renders an animation stylization effect applied to the three-dimensional digital object, the clip spanning a direction along a timeline; and
    a node graph portion comprising a node cluster representing the clip, the node cluster including an animate node, an effect node, and an action node;
  receiving input at the timeline portion of the animation interface modifying at least one parameter of the animation stylization effect to create a modified animation stylization effect that defines how the three-dimensional digital object is visually modified or manipulated during playback of the animation scene; and
  modifying the node graph portion of the animation interface based on the input at the timeline portion of the animation interface by updating at least one node of the node cluster to describe the modified animation stylization effect.

18. The computer-readable storage medium of claim 17, wherein the animate node includes a depiction of an animation curve for the animation stylization effect that represents a magnitude of the animation stylization effect as expressed on the three-dimensional digital object relative to a playback duration of the clip, wherein updating the at least one node of the node cluster comprises modifying a geometry of the animation curve.

19. The computer-readable storage medium of claim 17, wherein the input at the timeline portion of the animation interface modifies at least one of a duration, a start time, or an end time of the animation stylization effect by adjusting a size of the clip that spans the direction along the timeline or adjusting a position of the clip relative to the timeline.

20. A system comprising:
  a memory component; and
  a processing device coupled to the memory component, the processing device to perform operations comprising:
    displaying an animation interface that is useable to generate an animation scene depicting an animation of a three-dimensional digital object, the animation interface including:
      a timeline portion comprising a clip that visually renders an animation stylization effect applied to the three-dimensional digital object, the clip spanning a horizontal direction along a timeline; and
      a node graph portion comprising a node cluster representing the clip, the node cluster including an animate node, an effect node, and an action node;
    receiving input at the timeline portion of the animation interface modifying at least one parameter of the animation stylization effect to create a modified animation stylization effect that defines how the three-dimensional digital object is visually modified or manipulated during playback of the animation scene;
    modifying the node graph portion of the animation interface based on the input at the timeline portion of the animation interface by updating at least one node of the node cluster to describe the modified animation stylization effect; and
    generating a custom animation stylization effect based on the modified animation stylization effect, the custom animation stylization effect having a name defined by the effect node, an animation stylization effect defined by the action node, and a magnitude of the animation stylization effect displayed relative to a playback duration of the animation stylization effect defined by the animate node.

* * * * *